US011798108B2

(12) United States Patent
Hiroi et al.

(10) Patent No.: US 11,798,108 B2
(45) Date of Patent: Oct. 24, 2023

(54) TRANSPORTATION SERVICE PLANNING SYSTEM AND TRANSPORTATION SERVICE PLANNING METHOD

(71) Applicant: Hitachi, Ltd., Tokyo (JP)

(72) Inventors: Kazushige Hiroi, Tokyo (JP); Yujin Tsukada, Tokyo (JP); Nobuo Nukaga, Tokyo (JP)

(73) Assignee: HITACHI, LTD., Tokyo (JP)

( * ) Notice: Subject to any disclaimer, the term of this patent is extended or adjusted under 35 U.S.C. 154(b) by 245 days.

(21) Appl. No.: 17/317,995

(22) Filed: May 12, 2021

(65) Prior Publication Data

US 2021/0407021 A1    Dec. 30, 2021

(30) Foreign Application Priority Data

Jun. 26, 2020   (JP) .................................. 2020-110402

(51) Int. Cl.
*G06Q 30/00* (2023.01)
*G06Q 50/14* (2012.01)
(Continued)

(52) U.S. Cl.
CPC ............... *G06Q 50/14* (2013.01); *G06N 5/04* (2013.01); *G06N 7/01* (2023.01); *G06Q 10/067* (2013.01);
(Continued)

(58) Field of Classification Search
CPC ............. G06Q 30/06–08; G06Q 40/14; G06Q 10/067; G06Q 10/10; G06N 7/01; G06N 5/04

See application file for complete search history.

(56) References Cited

U.S. PATENT DOCUMENTS

| 5,863,203 | A | * | 1/1999 | Bragdon | ............... | G09B 19/167 |
| | | | | | | 434/30 |
| 2009/0234564 | A1 | * | 9/2009 | Onishi | ................... | G06Q 10/02 |
| | | | | | | 705/5 |
| 2019/0311307 | A1 | * | 10/2019 | Ramot | ............... | G01C 21/3438 |

FOREIGN PATENT DOCUMENTS

| CN | 109523776 A | 3/2019 |
| JP | 2019-082766 A | 5/2019 |
| WO | 2006/061885 A1 | 6/2006 |

OTHER PUBLICATIONS

Extended European Search Report received in corresponding European Application No. 21179377.3 dated Nov. 4, 2021.
(Continued)

*Primary Examiner* — Ethan D Civan
(74) *Attorney, Agent, or Firm* — MATTINGLY & MALUR, PC

(57) ABSTRACT

Provided is a transportation service planning system including an operation unit and a storage unit. The storage unit stores an evaluation index designated for each of transportation systems, a creation condition of a service plan for each of the transportation systems, and a service simulation condition for each of the transportation systems. The operation unit creates a service plan for each of the transportation systems on the basis of the creation condition of the service plan, simulates a service of each of the transportation systems on the basis of the service plan and the simulation condition, calculates the evaluation index designated for each of the transportation systems on the basis of the simulation results, outputs the service plan if all of the evaluation indices satisfy a prescribed standard, and revises the service plan if at least one of the evaluation indices does not satisfy the prescribed standard.

13 Claims, 14 Drawing Sheets

(51) Int. Cl.
  *G06N 5/04*   (2023.01)
  *G06Q 10/067*  (2023.01)
  *G06Q 10/10*   (2023.01)
  *G06Q 30/0601*  (2023.01)
  *G06N 7/01*   (2023.01)
  *G06Q 10/0639*  (2023.01)
  *G06Q 30/0201*  (2023.01)

(52) U.S. Cl.
  CPC ......... G06Q 10/10 (2013.01); G06Q 30/0631 (2013.01); *G06Q 10/06393* (2013.01); *G06Q 30/0201* (2013.01)

(56) References Cited

OTHER PUBLICATIONS

Liyanage, S. et al., "An Agent-Based Simulation Approach for Evaluating the Performance of On-Demand Bus Services", Sustainability, May 18, 2020, pp. 1-20, vol. 12, No. 10, URL: https://www.mdpi.com/2071-1050/12/10/4117/pdf>.

Shah, Y. et al., "Diagnosing Transportation: Developing Key Performance Indicators to Assess Urban Transportation Systems", Transportation Research Record, Jan. 1, 2013, pp. 1-12, vol. 2357, No. 1, URL: https://journals.sagepub.com/doi/pdf/10.3141/2357-01>.

\* cited by examiner

TRANSPORTATION DATA 411

| COUNTRY 901 | REGION 902 | START 903 | END 904 | LINK 905 | ROAD TYPE 906 | OPERATOR 907 | TRANSPORTATION MODE 908 | VEHICLE TYPE 909 | # OF CREW 910 | CAPACITY 911 | ID 912 |
|---|---|---|---|---|---|---|---|---|---|---|---|
| JP | TK | a | b | a-b | 1 | A | 1 | 4 | 2 | 200 | 1001 |
| JP | TK | a | b | a-b | 2 | B | 2 | 1 | 1 | 40 | 2002 |
| JP | TK | a | b | a-b | 3 | C | 3 | 2 | 1 | 8 | 3001 |
| JP | TK | a | b | a-b | 3 | D | 4 | 3 | 1 | 4 | 4001 |

| DATE 913 | DAY 914 | SCHEDULED TIME 915 | ACTUAL TIME 916 | DELAY 917 | ONBOARDING 918 | ALIGHTING 919 | TRANSPORTED 920 | OCCUPANCY 921 | TOTAL REVENUE 922 |
|---|---|---|---|---|---|---|---|---|---|
| 2018/7/19 | 4 | 7:00 | 7:01 | 1 | 20 | 5 | 22 | 0.11 | 30000 |
| 2018/7/19 | 4 | 7:30 | 7:32 | 2 | 9 | 2 | 10 | 0.25 | 5000 |
| 2018/7/19 | 4 | 7:45 | 7:50 | 5 | 2 | 1 | 3 | 0.375 | 1000 |
| 2018/7/19 | 4 | NA | 7:55 | NA | 1 | 0 | 1 | 0.25 | 700 |

FIG.9

RECOMMENDATION PLAN 512

| USER ID 1002 | USER ID | START POINT 1003 | END POINT 1004 | SECTION START 1005 | SECTION END 1006 | TRANSPORTATION MODE 1007 | LINK 1008 | ROAD TYPE 1009 | OPERATOR 1010 |
|---|---|---|---|---|---|---|---|---|---|
| 1001 | 1 | A | B | a | b | 1 | a-b | 1 | A |
| | 1 | A | B | c | d | 2 | c-d | 2 | B |
| | 2 | C | D | e | f | 3 | e-f | 3 | C |
| | 2 | C | D | g | h | 4 | g-h | 3 | D |

| VEHICLE TYPE 1011 | CAPACITY 1012 | ID 1013 | DEPARTURE DATA 1014 | DEPARTURE DAY 1015 | DEPARTURE TIME 1016 | ROUTE CHARACTERISTIC 1017 | PREDICTED SELECTION 1018 |
|---|---|---|---|---|---|---|---|
| 4 | 200 | 1001 | 2018/7/19 | 4 | 7:00 | 3 | 0.8 |
| 1 | 40 | 2002 | 2018/7/19 | 4 | 7:30 | 3 | 0.7 |
| 2 | 8 | 3001 | 2018/7/19 | 4 | 7:45 | 1 | 0.6 |
| 3 | 4 | 4001 | 2018/7/19 | 4 | NA | 1 | 0.5 |

*FIG.10*

TRANSPORTATION SERVICE PLANNING SYSTEM AND TRANSPORTATION SERVICE PLANNING METHOD

CLAIM OF PRIORITY

The present application claims priority from Japanese patent application JP2020-110402 filed on Jun. 26, 2020, the content of which is hereby incorporated by reference into this application.

BACKGROUND OF THE INVENTION

The present invention relates to a planning technique that arbitrates transportation services.

One technique for formulating a service plan for public transportation is the technique disclosed in Japanese Patent Application Laid-Open Publication No. 2019-082766 (Patent Document 1), for example. Patent Document 1 discloses a "public transportation service planning device for conducting service planning for a public transportation system is provided with: a creation unit that creates a service plan pattern constituted of a travel mode for a public transportation system, a frequency of service of the public transportation system, and information regarding lanes of a road; and an evaluation unit that evaluates the service plan pattern created by the creation unit with the degree of congestion of the road, the convenience, and the profitability as evaluation indices, on the basis of road usage mode information including information pertaining to the usage mode of road infrastructure for which constituent elements can be switched, and public transportation service information pertaining to the service of the public transportation system."

Also, one technique for searching for a route to a destination using a transportation means is the technique disclosed in WO/2006/061885 (Patent Document 2), for example. Patent Document 2 discloses an "empty seat route search system that includes: a service data DB that stores service data of each transportation means; a search service data DB that stores service data to be searched; a reservation information collection means that collects reservation information of each transportation means; a condition input means that inputs route search conditions including seating conditions; a route search means that searches for a transportation means that serves as the route with reference to the search service data DB on the basis of the reservation information collected by the reservation information collection means and the route search conditions; and an output means that outputs results of the route search, the route search means extracting a transportation means having reservation information that matches the route search conditions from the service data DB and forming the search service data DB prior to the route search, and then performing the route search."

SUMMARY OF THE INVENTION

Patent Document 1 proposes a method and a device by which service plans are formulated by evaluating the same KPIs such as the degree of congestion, the convenience, and the profitability for a plurality of transportation modes. However, KPIs differ depending on the transportation mode, and thus, even if the method of Patent Document 1 were adopted, a desirable service for the transportation mode or the operator cannot necessarily be attained.

Patent Document 2 proposes a method and device by which routes matching the preferences of the rider, routes with empty seats, or the like are recommended. However, with the method of Patent Document 2, it is not possible to find the destination and stopping points, and thus, travel demand itself does not increase. Also, the state and request priority of the user (whether the user wishes to prioritize being able to sit or getting to the destination quickly) differ depending on the user, and thus, it is necessary to consider these factors.

Additionally, there are no inventions in which the recommended results and the results of arbitrating services reflect each other, but because these factors influence each other, high accuracy results cannot be attained unless results that reflect each other are derived.

In order to solve at least one of the foregoing problems, a representative example of the present invention is a transportation service planning system, comprising: an operation unit; and a storage unit, wherein the storage unit stores therein: an evaluation index designated for each of a plurality of transportation systems; a creation condition of a service plan for each of the plurality of transportation systems; and a service simulation condition for each of the plurality of transportation systems, wherein the operation unit is configured to: create a service plan for each of the plurality of transportation systems on the basis of the creation condition of the service plan; simulate a service of each of the plurality of transportation systems on the basis of the service plan and the simulation condition; calculate the evaluation index designated for each of the plurality of transportation systems on the basis of the simulation results; output the service plan if all of the evaluation indices satisfy a prescribed standard; and revise the service plan if at least one of the evaluation indices does not satisfy the prescribed standard.

According to one aspect of the present invention, it is possible to realize a service in which the KPIs of all transportation modes do not decrease for a plurality of existing transportation modes, or even if a new transportation mode were added to the existing transportation modes, for example. Problems, configurations, and effects other than what was described above are made clear by the description of embodiments below.

BRIEF DESCRIPTION OF THE DRAWINGS

FIG. 9 is a diagram for explaining an example of a data structure of a transportation data stored in the service arbitration system according to an embodiment of the present invention.

FIG. 10 is a diagram for explaining an example of a data structure of a recommendation data generated by the travel recommendation system according to an embodiment of the present invention.

DETAILED DESCRIPTION OF EMBODIMENTS

Below, an embodiment of the present invention will be described with reference to the drawings.

<Concept>

Figure 1:
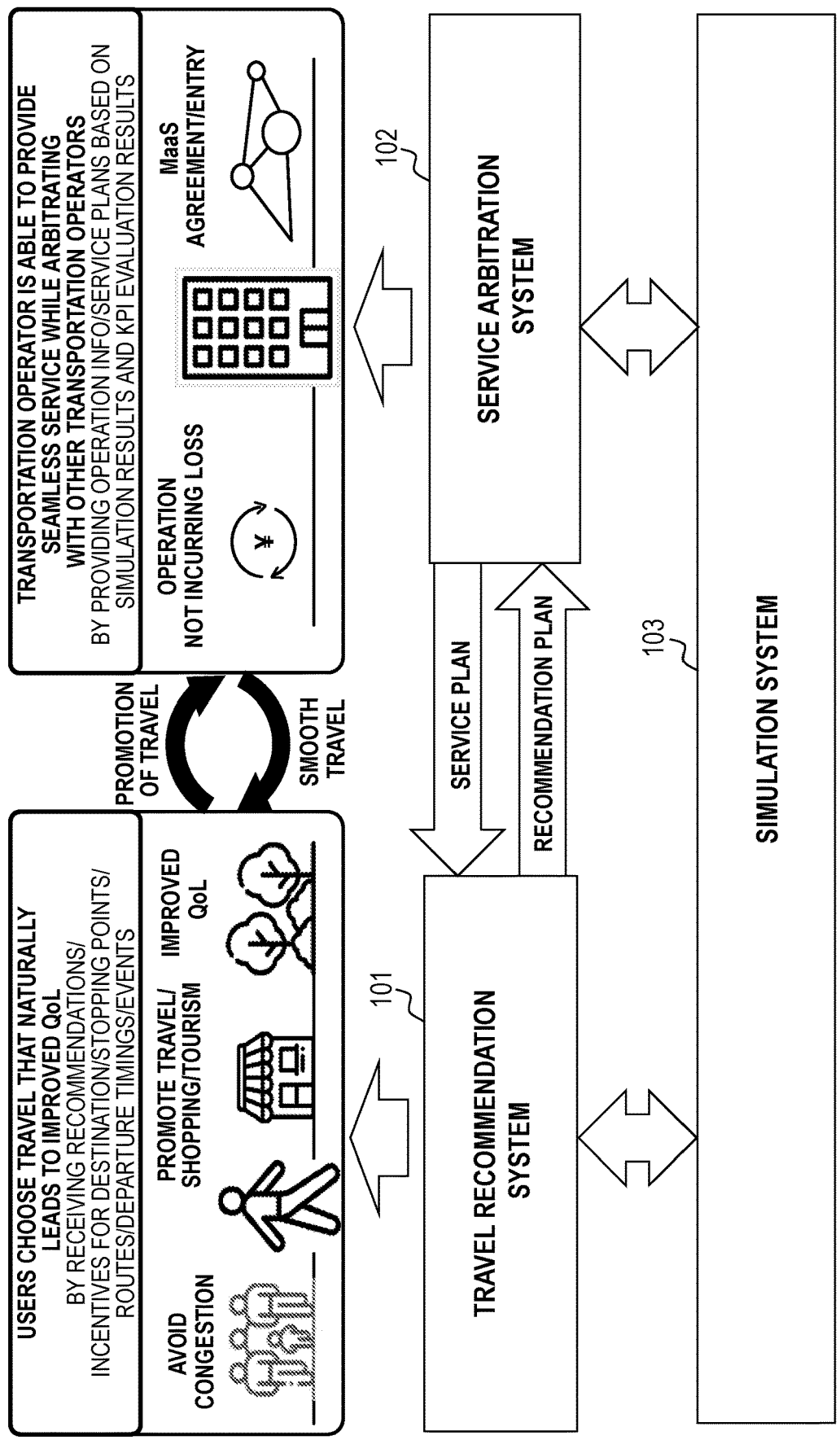
FIG. 1 is a diagram for explaining a concept of the present invention.

FIG. 1 is a diagram for explaining a concept of the present invention. A system according to one embodiment of the present invention includes a travel recommendation system 101, a service arbitration system 102, and a simulation system 103. The travel recommendation system 101 formulates a recommendation plan for increasing or decreasing travel demand by users on the basis of a service plan. The service arbitration system 102 performs service arbitration among one or more transportation modes by formulating a service plan on the basis of the recommendation plan.

The travel recommendation system 101 may formulate a recommendation plan according to a request by the user. Additionally, a mechanism by which feedback indicating whether the user followed recommendation results may be provided. The service arbitration system 102 may formulate a service plan in consideration of whether the user followed the recommendation results.

These formulated plans are realized by the simulation system 103 simulating the mutual effects between the plans.

According to the present invention, the user in particular can smoothly travel while avoiding congestion, for example, resulting in promotion of travel, shopping, and tourism, and improvement in quality of life (QoL).

Meanwhile, the transportation operators can satisfy the key performance indicators (KPI) of each operator to realize an operation that does not incur loss.

Additionally, it is possible to arrive at an agreement for the entry of new transportation modes or the like as a form of mobility-as-a-service (MaaS), for example. Conventionally, if a new transportation mode were to enter the market, it was unclear what impact this would have on the KPIs of existing operators, and thus, entry into the market tended to be difficult, but according to the present invention, it is possible to realize an operation in which the operators do not incur loss as described above.

In particular, it is possible not only to formulate a service plan in which the KPIs of the operators do not fall below designated values, but also to increase or decrease demand by users for travel along suitable routes at suitable times.

As a result, the user can attain recommendations/incentives for destinations/stopping points/routes/departure timings/events and the like, and travel that naturally leads to improved QoL can be anticipated.

Also, as a result of the provision of operation information/service plans based on simulation results and KPI evaluation results, transportation operators can be anticipated to provide seamless service while arbitrating with other transportation operators.

<System Configuration>

Figure 2:
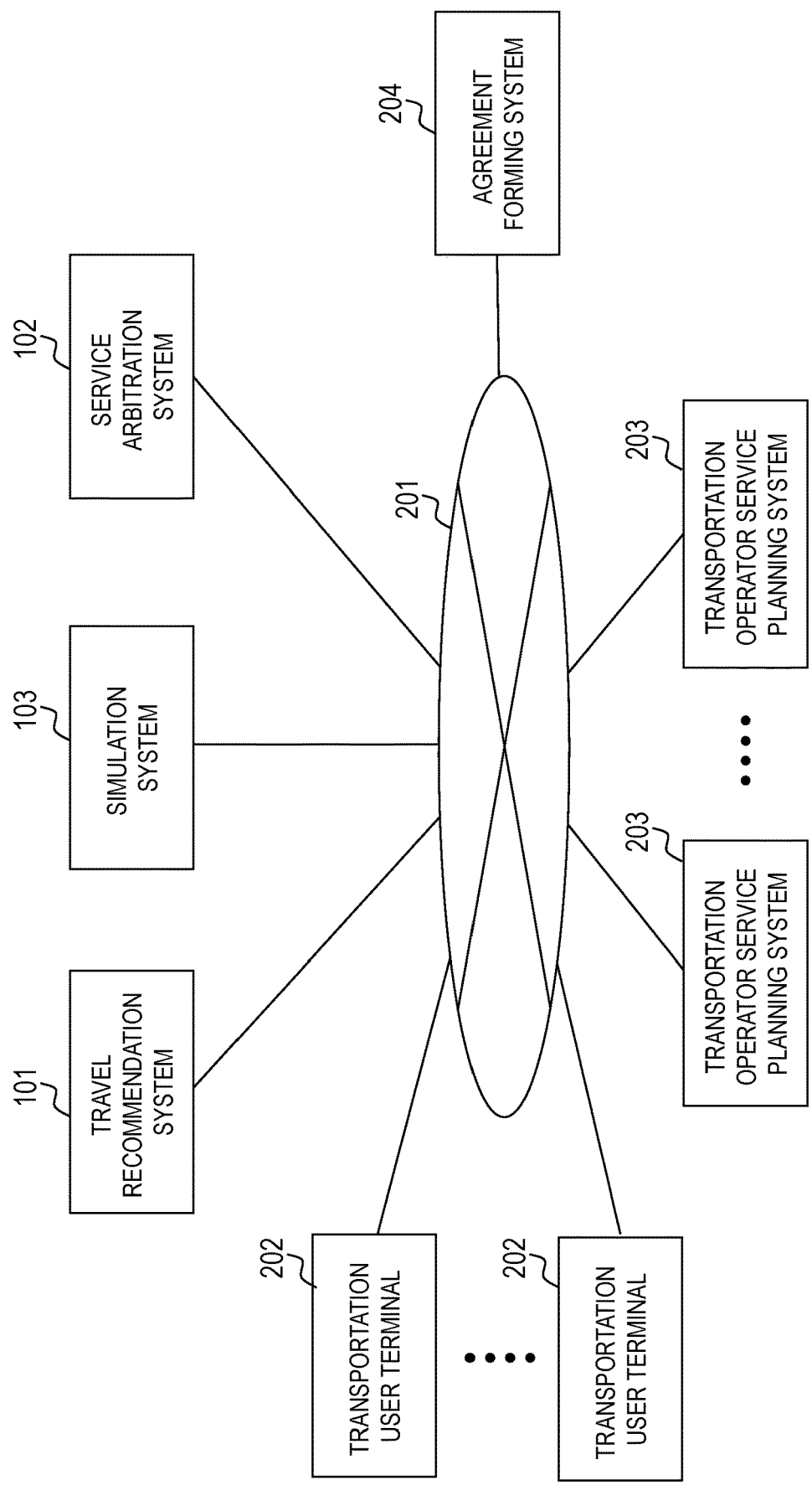
FIG. 2 is a block diagram showing one example of a system according to an embodiment of the present invention.

FIG. 2 is a block diagram showing one example of a system according to an embodiment of the present invention.

The system that realizes the present invention is constituted of at least the travel recommendation system 101, the service arbitration system 102, and the simulation system 103, which may each be realized by individual systems, or any two or all thereof may be realized by one system.

The travel recommendation system 101, the service arbitration system 102, and the simulation system 103 are connected to a network 201, and can transmit and receive data to/from each other via the network 201.

The system additionally includes one or more transportation user terminals 202, one or more transportation operator service planning systems 203, and an agreement forming system 204, which are connected to the network 201.

The service arbitration system 102 formulates an optimal service plan for a plurality of transportation operators and transportation modes, and provides this service plan to the transportation operator service planning system 203 and the agreement forming system 204.

The travel recommendation system 101 provides, to the transportation user terminals 202, recommendation/incentive information (hereinafter referred to simply as recommendations) for increasing travel demand.

The simulation system 103 simulates users, the delay time, and the like in a service section for each transportation operator and transportation mode on the basis of the service plan attained from the service arbitration system 102 and recommendation results attained from the travel recommendation system 101, and provides the simulation results to the service arbitration system 102 and the travel recommendation system 101.

The transportation user terminal 202 is a terminal device used by transportation users, and can display information recommended by the travel recommendation system 101 and receive input from the transportation user for selecting the recommendation information.

The transportation operator service planning system 203 and the agreement forming system 204 are systems used by transportation operators as well as one or more transportation operators, local governments, and the like, and can display the service state and KPIs from service plans formulated by the service arbitration system 102 or designate formulation conditions for the service plans. In particular, each transportation operator service planning system 203 is used by each transportation operator or operating company for a transportation mode in order to formulate service plans for the operator or a transportation mode provided by the operator. The agreement forming system 204 is used by a plurality of transportation operators or operating companies of a plurality of transportation modes to confirm or revise service states and KPIs for all operators or for an individual transportation operator or a transportation mode of the individual transportation operator. Also, the agreement forming system 204 may be used by local governments or the like in order to confirm and revise the service state and KPI values of a plurality of transportation modes in the region.

<Travel Recommendation System Configuration>

Figure 3:
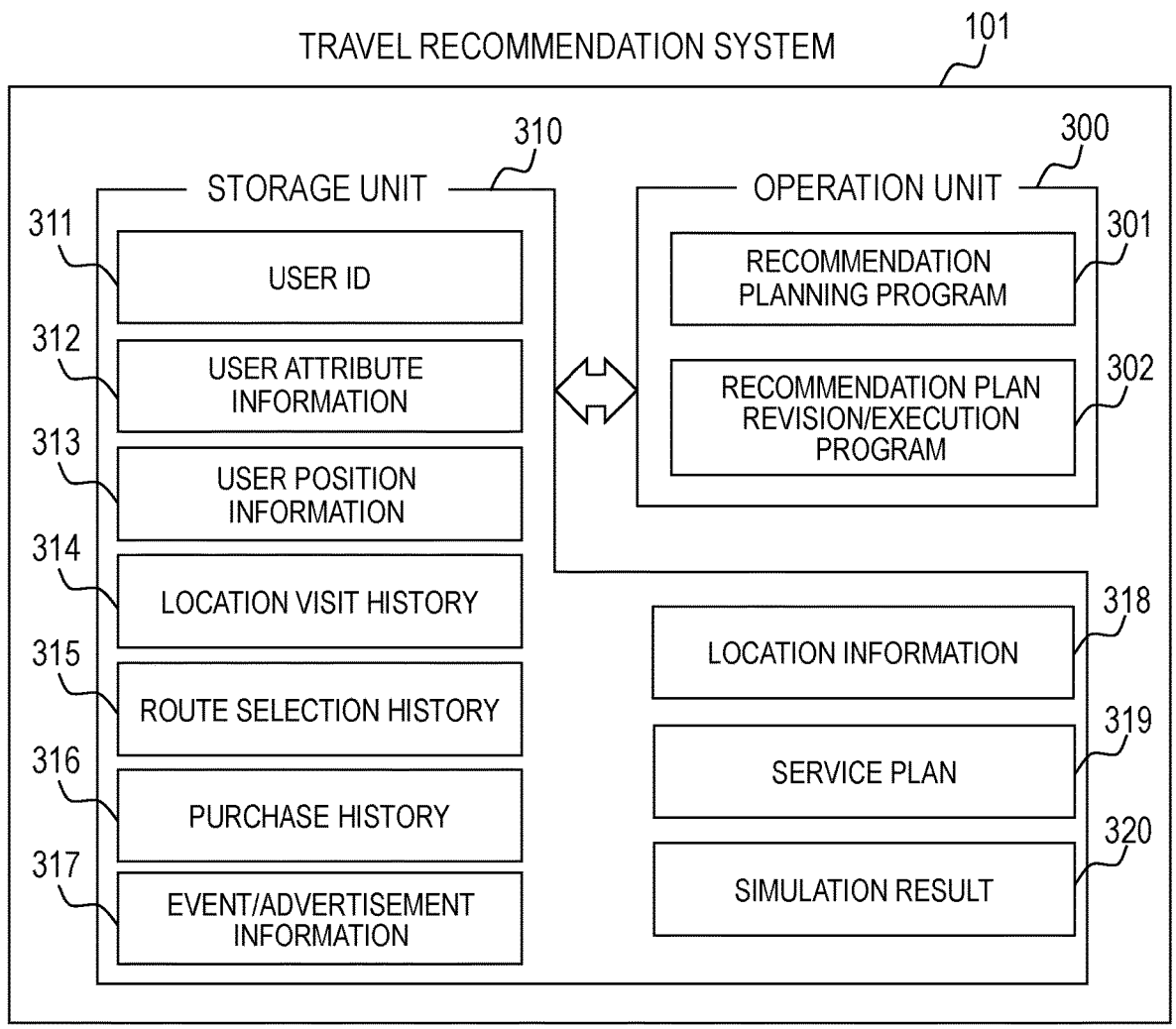
FIG. 3 is a block diagram showing a configuration example of a travel recommendation system according to an embodiment of the present invention.

FIG. 3 is a block diagram showing a configuration example of the travel recommendation system 101 according to an embodiment of the present invention.

The travel recommendation system 101 is constituted at least of a storage unit 310 and an operation unit 300.

The storage unit 310 stores information associated with the user such as a user ID 311 of the transportation user, user attribute information 312, user position information 313, a location visit history 314, a route selection history 315, and a purchase history 316, as well as location information 318 of a facility or the like and event/advertisement information 317 (including coupon information, etc.) of a facility or the like. Also, the storage unit 310 stores a service plan 319 generated by the service arbitration system 102 and a simulation result 320 generated by the simulation system 103.

The user ID 311 is a unique identifier for each user, and is an ID for managing which recommendations are given to which user.

The user attribute information 312 is attribute information such as the age and gender of the user, for example.

The user position information 313 is position information indicating where the residence and workplace of the user are located, where the user is currently located, or the like, and may be information indicating a region name or the latitude/longitude.

The location visit history 314 is information indicating where and when a user visited a location, and may be information such as a place name, a facility name, or the latitude/longitude.

The route selection history 315 is a list indicating which route was selected by the user in order to visit which location and when, as well as under which conditions the route was selected (less congested/open seats, faster trip, easier trip, less expensive trip, etc.). The route selection history 315 may, for example, be a list of sets of link information and conditions of transportation data to be described later in correspondence with each history of the aforementioned location visit history 314.

The purchase history 316 is information indicating what was purchased by the user and when, and may be points of sales (POS), for example.

The above information may be stored as individual data and be configured to enable viewing thereof in association with each user ID, or may be included in one data table.

The location information 318 is information such as the location and attributes of a facility or the like, and may be point of interest (POI) information, for example.

The event/advertisement information 317 is information indicating the existence of an event at a facility or the like and the content thereof, or advertisement information. The event/advertisement information 317 may be information indicating the time, location, and performer of a concert, advertisement information indicating the cheapest products and when and where such products are available, coupon information, or the like.

The service plan 319 is a service plan generated by the service arbitration system 102, and details thereof will be described later.

The simulation result 320 is a simulation result generated by the simulation system 103, and details thereof will be described later.

In the operation unit 300, a recommendation planning program 301 and a recommendation plan revision/execution program 302 are in operation. The recommendation planning program 301 and the recommendation plan revision/execution program 302 may be stored in the storage unit 310 and read and executed as necessary by the operation unit 300, for example.

The recommendation planning program 301 is a program that causes the operation unit 300 to execute a process for planning the type of recommendation to issue to the user. During this process (details to be described later), the destination, stopping points, the route, the departure timing and point, and the like are planned on the basis of the ID, the position, the visit history, the purchase history, the event/advertisement information, and the location information as well as the simulation result by the simulation system 103 to be described later.

The recommendation plan revision/execution program 302 is a program that causes the operation unit 300 to execute a process of revising the recommendation content planned by the process based on the recommendation planning program 301. This process includes a process (details to be described later) of providing, to the transportation user terminal 202, the destination, the stopping points, the route, the departure timing and point, and the like on the basis of the ID, the position, the visit history, the purchase history, the event/advertisement information, and the location information as well as the simulation system results to be described later.

<Service Arbitration System Configuration>

Figure 4:
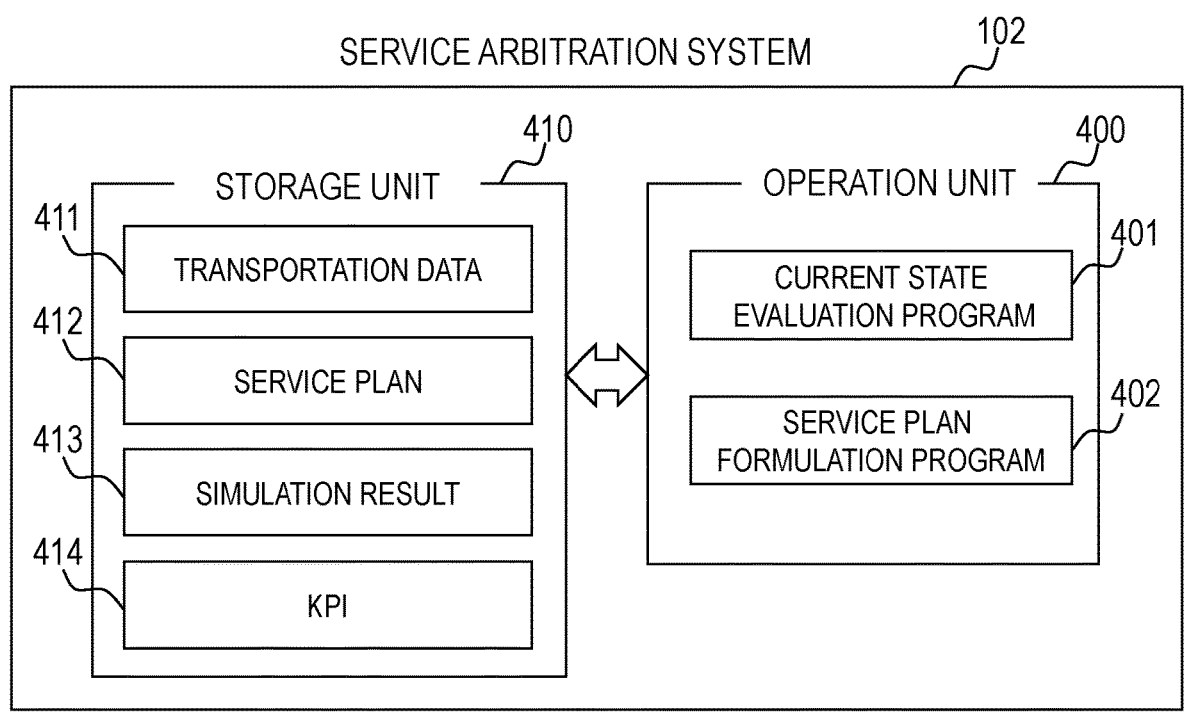
FIG. 4 is a block diagram showing a configuration example of a service arbitration system according to an embodiment of the present invention.

FIG. 4 is a block diagram showing a configuration example of the service arbitration system 102 according to an embodiment of the present invention.

The service arbitration system 102 is constituted of at least a storage unit 410 and an operation unit 400.

The storage unit 410 stores transportation data 411, a service plan 412, a simulation result 413, and a KPI 414.

The transportation data 411 indicates service performance and usage performance of the transportation system operated by the transportation operators or operating companies of the transportation modes.

The service plan 412 is a service plan generated by the service arbitration system 102, and details thereof will be described later.

The simulation result 413 is a simulation result generated by the simulation system 103, and details thereof will be described later.

The KPI 414 is a KPI designated by each transportation operator, for example, and details thereof will be described later.

In the operation unit 400, a current state evaluation program 401 and a service plan formulation program 402 are in operation.

The current state evaluation program 401 is a program that causes the operation unit 400 to execute a process of calculating KPIs designated by the transportation operator service planning system 203 and/or the agreement forming system 204 for each transportation operator or each transportation mode, and evaluating whether the KPIs are less than a designated value. Here, the designated value of the KPIs may be a desired value to be satisfied as KPIs designated by each transportation operator or the operating company of each transportation mode.

The KPI may be at least one of the revenue, cost, profit, and the like, in addition to the transportation operator, the transportation mode, the service, the number of users in each section, the supply/demand balance (the difference between supply and demand; the difference between capacity and occupancy, for example), the delay time, and the crowdedness of the vehicle (number of users per traveled distance), and the like.

The operation unit 400 executes a process of calculating the KPI values designated by the transportation operators or the operating companies of the transportation mode according to the current state evaluation program 401, and displaying the KPI values in the transportation operator service planning system 203 and/or the agreement forming system 204. At this time, the service state such as the delay time and the usage state such as the number of riders and the vehicle occupancy may be displayed as an animation or the like. Display examples thereof will be described later.

The service plan formulation program 402 is a program that links to the travel recommendation system 101 and the simulation system 103 in order to execute, in the operation unit 400, a process of calculating the KPI values designated by the transportation operator service planning system 203 and/or the agreement forming system 204 for each transportation operator or each transportation mode, and formulating a service plan (a plan for a route, a schedule, a vehicle to be used, and the like) in which the KPI values do not fall below these designated values. In particular, this process includes a process of evaluating the KPI values using simulation results by the simulation system 103 to be mentioned later regarding the transportation operators and the transportation modes, formulating a service plan in which the KPI values do not fall below the designated values, and providing a service plan together with predicted KPI values of the service plan to the transportation operator service planning system 203 and/or the agreement forming system 204 (details will be described later).

<Simulation System Configuration>

Figure 5:
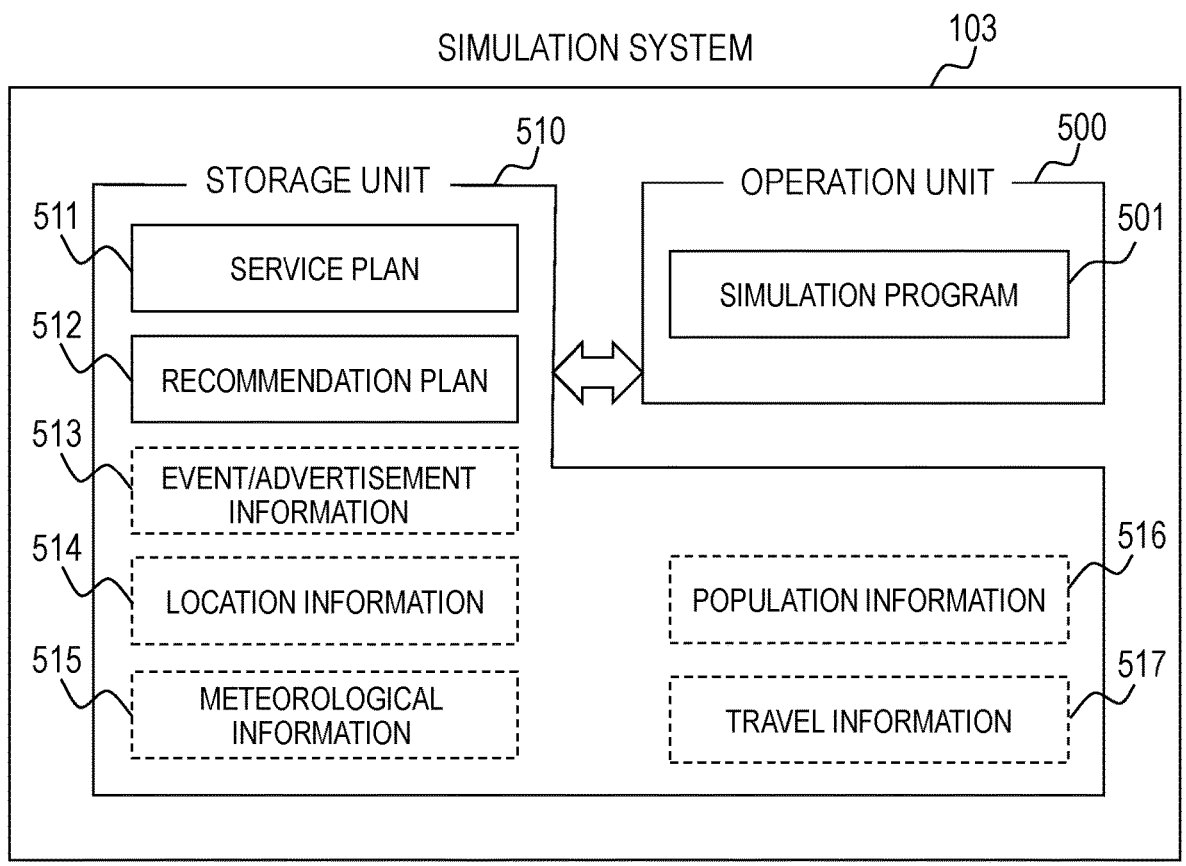
FIG. 5 is a block diagram showing a configuration example of a simulation system according to an embodiment of the present invention.

FIG. 5 is a block diagram showing a configuration example of the simulation system 103 according to an embodiment of the present invention.

The simulation system 103 is constituted at least of a storage unit 510 and an operation unit 500.

The storage unit 510 may store a service plan 511 (to be described later) generated by the service arbitration system 102 and a recommendation plan 512 (to be described later) generated by the travel recommendation system 101, as well as the previously described location information 514 of a facility or the like and event/advertisement information 513 (including coupon information) of the facility or the like. Also, the storage unit 510 may store meteorological information 515 including information indicating whether the weather is clear or rainy, air temperature, wind speed, humidity, and the like; population information 516 such as population statistic information; travel information 517 such as information indicating from where and to where a person traveled at what time; and the like.

In the operation unit 500, the simulation program 501 operates, simulating the number of users and the delay time for each transportation operator, transportation mode, service, and area for when the transportation mode is operated according to the service plan 511 stored in the storage unit 510. At this time, the operation unit 500 may perform the simulation with the simulation conditions being the event/advertisement information 513, the location information 514, the meteorological information 515, the population information 516, the travel information 517, and the like stored optionally in the storage unit 510, for example. This can be realized through a publicly known simulation technique or the like.

However, in the present invention, simulation is performed taking into consideration, in addition to the aforementioned information, the recommendation plan 512 generated by the travel recommendation system 101. This can be realized by correcting the number of users and the delay time by multiplying the number of users and the delay time by the usage probability for the transportation operator, transportation mode, service, and area, which were recommended by the recommendation plan 512, and a recommendation selection probability to be mentioned later.

<Inter-System Linking Operation>

Figure 6:
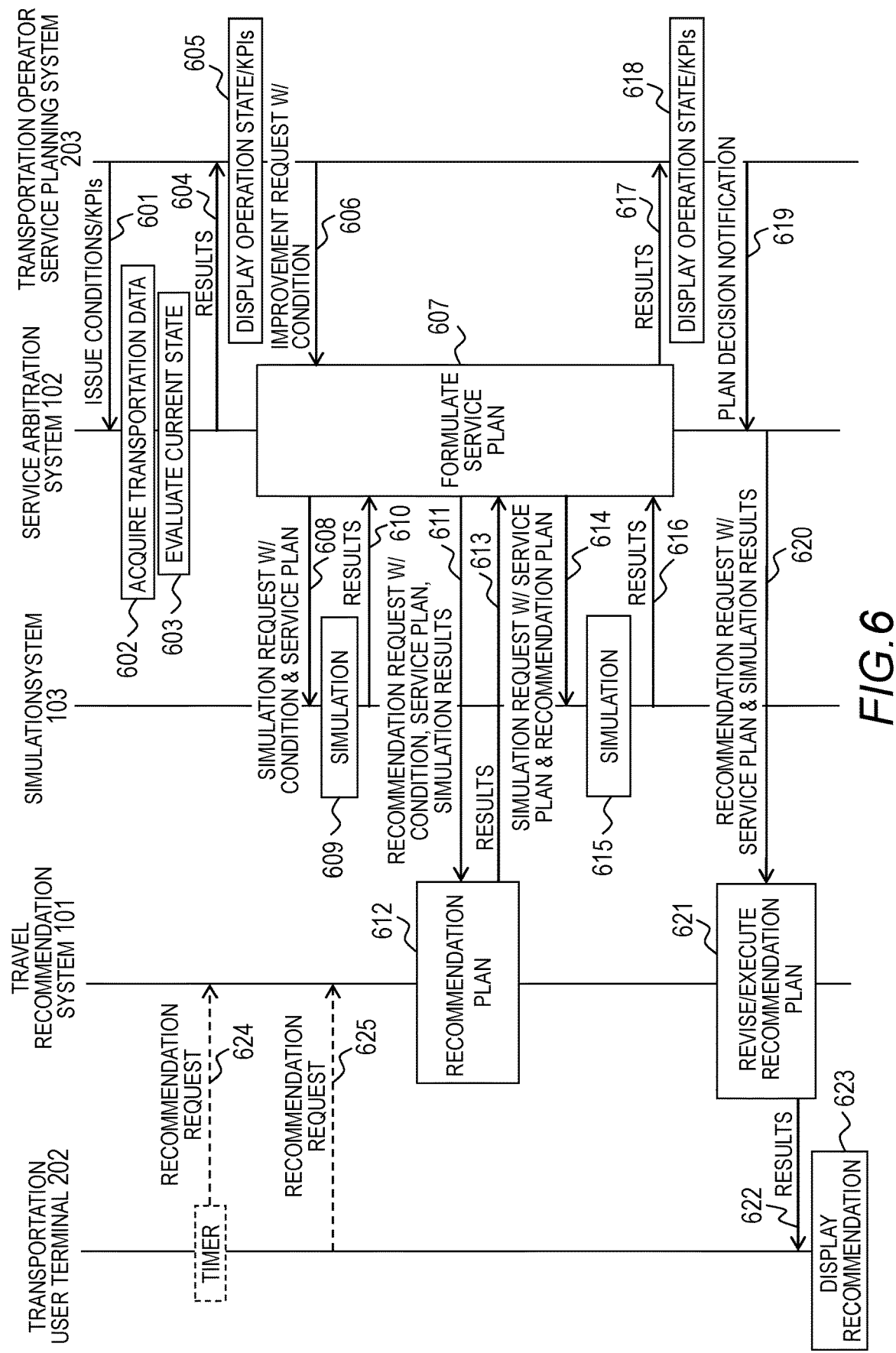
FIG. 6 is a sequence diagram showing an inter-system linking operation example according to an embodiment of the present invention.

FIG. 6 is a sequence diagram showing an inter-system linking operation example according to an embodiment of the present invention.

In the process shown in FIG. 6, first, the agreement forming system 204 or the transportation operator service planning system 203 designates the KPIs and issues the KPIs to the service arbitration system 102 (step 601). At this time, in particular, any one of or a combination of the transportation operator, the transportation mode, the service, the area, and the like to be improved may be designated as the conditions.

The service arbitration system 102 acquires transportation data (step 602). The aforementioned current state evaluation program 401 evaluates the current state on the basis of the acquired transportation data (step 603). Specifically, the service arbitration system 102 calculates the service state and the KPI values. At this time, if the transportation operator, the transportation mode, the service, the section, and the like to be improved were designated in step 601 as conditions, the service arbitration system 102 may acquire transportation data corresponding to those conditions.

The service arbitration system 102 provides the current state evaluation results, attained from the evaluation performed in step 603, to the agreement forming system 204 or the transportation operator service planning system 203 (step 604).

The agreement forming system 204 or the transportation operator service planning system 203 displays the service state, KPI values, and the like on the basis of the current state evaluation results provided by the service arbitration system 102 in step 604 (step 605). Display examples at this stage will be described later.

The transportation operator, local government officials, or the like confirm the service state, the KPI values, and the like displayed in step 605, and the agreement forming system 204 or the transportation operator service planning system 203 issues an improvement request to the service arbitration system 102 (step 606). At this time, in particular, any one of or a combination of the transportation operator, the transportation mode, the service, the section, and the like to be improved may be designated.

The service arbitration system 102 operates the service plan formulation program 402 on the basis of the improvement request issued in step 606 (step 607). Details of the processing content of the service plan formulation program 402 will be described later. A summary thereof will be stated below.

The service arbitration system 102 (service plan formulation program 402) formulates a service plan on the basis of the improvement request and conditions issued in step 606 (step 607), the formulated service plan is issued to the simulation system 103, and a simulation request is issued to the simulation system 103 (step 608).

The simulation system 103 operates the aforementioned simulation program 501 on the basis of the service plan issued in step 608 and the simulation request issued in step 608, and the number of users and the delay time are simulated for a case in which the service plan issued in step 608 is implemented (step 609). At this time, the simulation system 103 may acquire the conditions of step 606 and execute the simulation under such conditions.

Also, at this time, the simulation system 103 may execute a simulation in which at least one of the event/advertisement information 513, the location information 514, the meteorological information 515, the population information 516, and the travel information 517 or information extracted therefrom is used as the simulation condition.

The simulation system 103 issues the results of the simulation performed in step 609 to the service arbitration system 102 (service plan formulation program 402) (step 610).

The service arbitration system 102 (service plan formulation program 402) once again calculates/evaluates the KPI values on the basis of the simulation results issued in step 610 (step 607).

If, as a result of evaluating the KPI values in step 607, it is found that the KPI values are not satisfied, the service arbitration system 102 (service plan formulation program 402) issues, to the travel recommendation system 101, the service plan; the simulation results; and conditions to be improved such as the transportation operator, the transportation mode, the service, the section, and the like, and issues a recommendation request (step 611). Here, the recommendation request is issued if the KPI values are not satisfied, but the configuration is not limited thereto, and the recommendation request may be issued even if the KPIs were satisfied.

The travel recommendation system 101 operates the recommendation planning program 301 on the basis of the recommendation request issued in step 611 (step 612). Details of the processing content of the recommendation planning program 301 will be described later. A summary thereof will be stated below.

The travel recommendation system 101 (recommendation planning program 301) formulates a plan as to what recommendation (such as destination, stopping point, route, departure timing and point, etc.) to provide to which user on the basis of the recommendation request, conditions, service plan, and simulation results issued in step 611 (step 612).

The travel recommendation system 101 (recommendation planning program 301) issues the recommendation plan results to the service arbitration system 102 (service plan formulation program 402) (step 613).

The service arbitration system 102 (service plan formulation program 402) issues, to the simulation system 103, the recommendation plan and the service plan issued in step 613, and issues a simulation request to the simulation system 103 (step 614). At this time, the service arbitration system 102 may revise the service plan.

The simulation system 103 operates the aforementioned simulation program 501, and once again simulates the number of users and the delay time on the basis of the recommendation plan and the service plan issued in step 614 (step 615).

The simulation performed in step 615 can be executed in a similar manner to step 609. However, in step 615, the condition that at least some transportation users have traveled according to the recommendation plan issued in step 614 is added to the simulation conditions. The probability that the transportation user travels according to the recommendation plan corresponds to the selection prediction (see FIG. 10) to be described later, for example.

The simulation system 103 issues the results of the simulation performed in step 615 to the service arbitration system 102 (service plan formulation program 402) (step 616).

The service arbitration system 102 (service plan formulation program 402) once again calculates/evaluates the KPI values on the basis of the simulation results issued in step 616 (step 607). Travel based on the recommendation plan is included in the simulation conditions of step 615 as described above, and thus, it is possible to evaluate the effect on the KPIs of the recommendations based on the recommendation plan.

The service arbitration system 102 (service plan formulation program 402) issues, to the agreement forming system 204 or the transportation operator service planning system 203, the simulation results issued in step 616 and the calculation/evaluation results of the KPI values calculated/evaluated in step 607 on the basis of the simulation results (step 617).

The agreement forming system 204 or the transportation operator service planning system 203 displays the service state and the KPI values on the basis of the simulation results and calculation/evaluation results for the KPI values issued in step 617 (step 618). Display examples at this stage will be described later.

When the transportation operator, local government official, or the like using the agreement forming system 204 or the transportation operator service planning system 203 approves of the plan, the agreement forming system 204 or the transportation operator service planning system 203 issues a plan decision notification to the service arbitration system 102 (step 619).

Upon receiving the plan decision notification issued in step 619, the service arbitration system 102 issues the service plan and the simulation results issued in step 616 to the travel recommendation system 101, and issues a recommendation request to the travel recommendation system 101 (step 620).

The travel recommendation system 101 operates the recommendation plan revision/execution program 302 on the basis of the recommendation request issued in step 620 (step 621). Details of the processing content of the recommendation plan revision/execution program 302 will be described later. A summary thereof will be stated below.

The travel recommendation system 101 (recommendation plan revision/execution program 302) revises the recommendation plan formulated in step 612 on the basis of the recommendation request, the service plan, and the simulation results issued in step 620 (step 621). This is because the congestion state and the service plan might have been revised in step 614, for example, and as a result, the recommendation plan might also need to be revised.

The travel recommendation system 101 (recommendation plan revision/execution program 302) issues the recommendation plan results revised in step 621 to the transportation user terminal 202 (step 622).

The transportation user terminal 202 displays the recommendation plan results issued in step 622 (step 623). Display examples at this stage will be described later.

Through the process above, it is possible to formulate the service plan and issue recommendations to the user, and it is possible to increase/decrease travel demand and to satisfy the KPIs of the transportation operator.

In the present embodiment, the process of the service arbitration system 102 triggers the creation and revision of the recommendation plan by the travel recommendation system 101, but the transportation user may explicitly issue a recommendation request using the transportation user terminal 202 (step 625). As a result, it is possible for the transportation user to receive a recommendation, at will, for a location to which the transportation user would likely wish to travel, and it is possible for the recommendation results to be reflected in the service plan.

Also, recommendation requests may be periodically issued according to a timer in the transportation user terminal 202 (step 624). As a result, it is possible to issue periodically, to the transportation user, a recommendation for a location to which the transportation user would likely wish to travel, and to have the recommendation results reflected in the service plan.

<Recommendation Planning and Recommendation Plan Revision/Execution Process>

Figure 7:
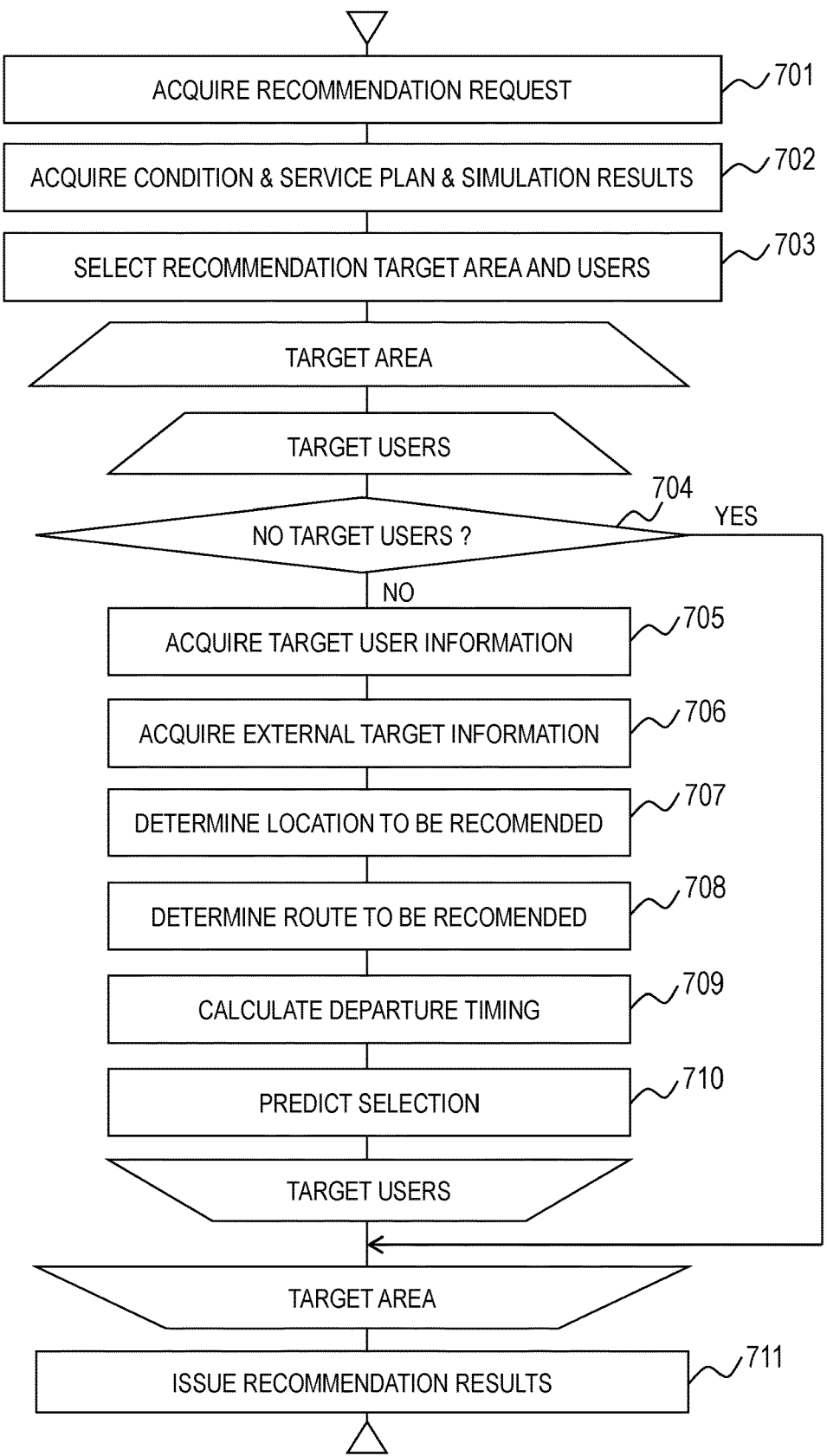
FIG. 7 is a flowchart showing an example of a process executed by a recommendation planning program of the travel recommendation system according to an embodiment of the present invention.

FIG. 7 is a flowchart showing an example of a process executed by the recommendation planning program 301 of the travel recommendation system 101 according to an embodiment of the present invention.

The recommendation planning program 301 executes the process described below. The process described as being executed by the recommendation planning program 301 in the present embodiment is actually executed by the operation unit 300 of the travel recommendation system 101 in accordance with the recommendation planning program 301. This also applies to other programs. For example, the process described as being executed by the service plan formulating program 402 is actually executed by the operation unit 400 of the service arbitration system 102 in accordance with the service plan formulating program 402.

The recommendation planning program 301 receives a recommendation request from the service plan formulating program 402 to be described later (step 701).

The recommendation planning program 301 acquires the conditions, the service plan, and the simulation results from the service plan formulating program 402 to be described later (step 702). Here, examples of the conditions include the transportation operator, the transportation mode, the service, the section, and the like to be improved. The service plan is a service plan including the timetable, the route, the vehicle (capacity), and the like of the transportation mode to be operated. The simulation results are results of a simulation on the transportation operator, the transportation mode, the service, and the number of users in each section, the delay time, and the like.

The recommendation planning program 301 selects a recommendation target area and recommendation target users within that area on the basis of the conditions and the service plan acquired in step 702 (step 703). For example, the recommendation planning program 301 selects at least one area relevant to the transportation operator, the transportation mode, the service, the section, and the like based on the conditions.

At this time, the recommendation planning program 301 may determine the size of an area such that a predetermined number of people or residents are present within that area, surrounding the service area of the transportation mode of the transportation operator, the service, and the section. The target users may be those who reside or are located in the selected area.

Alternatively, the recommendation planning program 301 may choose, as the target area, an area where the number of people who are present or reside within the area greatly differs from the number of users attained from the simulation results, and designate the area and those who are present or reside within the area to a priority area and priority target users. Furthermore, the selected areas and target users may be made into an area-specific list for future reference.

The area, the target users, or the number of target users may be determined by the service plan formulating program 402, and issued to the recommendation planning program 301 as conditions.

The recommendation planning program 301 performs the following process on all of the selected target users for each of the selected target areas.

The recommendation planning program 301 determines whether there still are the target users in the target area who have not been subjected to the process described below (step 704), and if there are no remaining target users, the following process is performed on all of the target users in another target area.

The recommendation planning program 301 acquires target user information (step 705). The target user information may include user attribute information such as the age and gender of the user, user location information such as the current location and the residence of the user, a location visit history, a route selection history, a purchase history, and the like, for example.

The recommendation planning program 301 acquires external target information (step 706). The external target information may include information on an event to be held, advertisement information, location information including attributes and position information of a facility or a tourist attraction, and the like, for example.

The recommendation planning program 301 determines a location to be recommended (step 707). Examples of the determination method includes a method in which attributes of preferred locations (such as a place with a great view) are identified from the location visit history of the target user on the basis of the target user information acquired in step 705 and the external target information acquired in step 706, and a location that has not been visited recently by the target user having the attributes is selected as the recommendation.

Alternatively, a location that was recently visited by a user who has a location visit history similar to that of the target user and that has not recently been visited by the target user may be selected as the recommendation. Furthermore, a location featuring a product that is likely to match the preferences of the target user may be selected as the recommendation by analyzing the purchase history of the target user to identify the preferences of the target user, or a venue of an event near the target user may simply be selected as the recommendation.

The recommendation planning program 301 determines a route to be recommended (step 708). For example, the recommendation planning program 301 may choose, as the recommendation, a route that was found by a publicly known route search technique or the like, on the basis of the location information of the target user acquired in step 705 (user location information), the position information of the location to be recommended, which was determined in step 707, and the service plan acquired in step 702.

At this time, the recommendation planning program 301 may identify the preferences of the target user from the route selection history of the target user acquired in step 705, and select a route that matches their preferences as the recommendation. For example, the recommendation planning program 301 may choose, as the recommendation, a route that the target user is likely to choose, among a less crowded route, a less expensive route, a faster route, an easier route with less transfers, and the like.

Alternatively, if the user attributes acquired in step 705 indicate that the target user is the elderly, the recommendation planning program 301 may choose a route with open seats as the recommendation. Furthermore, the recommendation planning program 301 may choose, as the recommendation, a route that is as similar as possible to the route often taken by the target user, or may choose a route that is as different as possible from the route often taken by the target user. When there is congestion on the route, the recommendation planning program 301 may recommend nearby stopping points before the user reaches the congested point, on the basis of the facility information and the like. At this time, the recommendation planning program 301 may recommend a route by determining when the congestion will be cleared, or may recommend a new route by estimating the time at which the congestion will be cleared. Less congested routes or routes with open seats may be identified on the basis of the simulation results acquired in step 702.

The recommendation planning program 301 calculates a departure timing (step 709). For example, the recommendation planning program 301 may calculate a typical travel time on foot or by bike or the like to the starting point with a fixed departure time on the route determined in step 708, on the basis of the location information of the target user acquired in step 705 (user location information) and the distance to the starting point, and figure out the departure timing for the user to make it to the starting point by the fixed departure time.

In particular, if the route with open seats was chosen as the recommendation in step 708, the recommendation planning program 301 may calculate a typical travel time on foot or by bike or the like to the starting point with a fixed departure time on the route, on the basis of the distance to the starting point, and figure out the departure timing for the user to make it to the starting point by the fixed departure time. This way, it is possible to suggest to the user that if they start walking now, they are likely to find an open seat.

The recommendation planning program 301 performs selection prediction (step 710). The selection prediction can be performed by calculating the probability of the recommendation being followed, on the basis of the past data indicating the location recommendations and route recommendations that have been actually selected or used. By making this prediction results available to the simulation system as the aforementioned recommendation selection probability, the simulation system 103 can perform simulation taking into account the recommendation plan formulated by the travel recommendation system 101 as described above.

When the recommendation planning program 301 has formulated a recommendation plan for all of the target users in all of the target areas, the recommendation planning program 301 issues the recommendation results to the service arbitration system 102 (service plan formulating program 402) (step 711), and ends the process. One example of the recommendation result data will be described later.

The process of the recommendation planning program 301 was described above, but the same applies to the process of the recommendation plan revision/execution program 302. However, as opposed to the recommendation planning program 301 issuing the recommendation results to the service arbitration system 102 in the end, the recommendation planning revision/execution program 302 issues the recommendation results to the transportation user terminal in the end.

<Service Plan Formulating Process>

Figure 8:
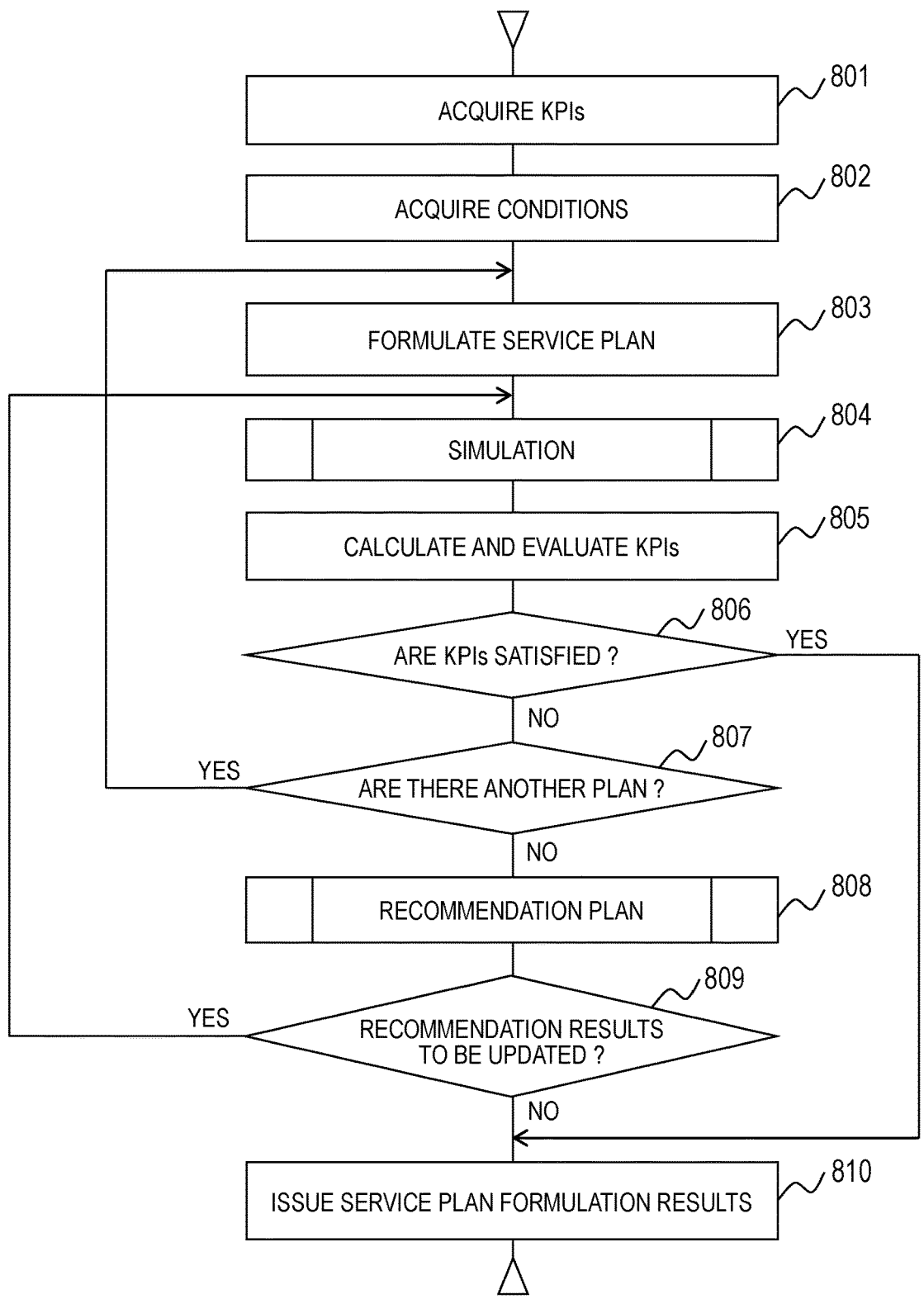
FIG. 8 is a flowchart showing an example of a process executed by a recommendation plan formulating program 402 of the travel recommendation system according to an embodiment of the present invention.

FIG. 8 is a flowchart showing an example of a process executed by the recommendation plan formulating program 402 of the travel recommendation system 102 according to an embodiment of the present invention.

The service plan formulating program 402 executes the following process.

The service plan formulating program 402 acquires KPIs for each transportation operator or each transportation mode (step 801). For example, KPIs designated by the transportation operator may be issued to the service plan formulating program 402 via the agreement forming system 204 or the transportation operator service planning system 203. In this case, the issued KPIs are stored in the storage unit 410 as the KPI 414. Alternatively, KPIs for each transportation operator or each transportation mode may be set in the service plan formulating program 402 in advance (specifically, the KPIs may be stored in the storage unit 410 as KPI 414, for example).

Alternatively, KPIs for each transportation operator or for each transportation mode may be stored in a file or the like, and attained by the service plan formulating program 402 by loading the file. When each transportation operator has a plurality of KPIs specified in any one of the aforementioned methods, some KPIs may be given priority over others.

The KPIs for each transportation operator or for each transportation mode acquired here may include information specifying an evaluation index to be used, among the number of users, the supply/demand balance, the delay time, the crowdedness of the vehicle, and the cost, revenue, and the like, and information specifying a standard value to determine whether that evaluation index is satisfied or not.

A plurality of transportation operators may designate the same KPIs as each other, or different KPIs, respectively. If one transportation operator operates a plurality of transportation modes (such as a plurality of railroad networks, or a plurality of different transportation modes such as rail transport, bus, and the like), the same KPIs may be used, or different KPIs may be designated to the respective modes. In addition, each line, route, or section of a transportation mode may have a designated KPI.

The service plan formulating program 402 acquires conditions such as the transportation mode, service, section, and the like with which a service plan is to be formulated from the agreement forming system 204 or the transportation operator service planning system 203 (step 802). At this time, the service plan formulating program 402 may also acquire information that affects those conditions such as the route and timetable of a transportation mode of other companies, as well as changes made to the route and timetable. The service plan formulating program 402 may acquire, as other conditions, asset information such as available vehicles, the type of those available vehicles (capacity), available drivers, and staff members required for the service.

The service plan formulating program 402 formulates a service plan on the basis of the KPIs acquired in step 801 and the conditions acquired in step 802 (step 803). At this time, the service plan formulating program 402 makes a change to the timetable, the route, the vehicle used, and the like in the service plan. For example, when the number of users in one section is the KPI and the KPI value falls below a designated value, the service plan may be revised such that the route goes through another area with a greater population, on the basis of the population information such as the population statistic data.

Alternatively, when the demand/supply balance is the KPI and vehicles with lower occupancy and vehicles with higher occupancy alternate, the service plan may be revised such that some of the vehicles are replaced with smaller vehicles.

If congestion constantly occurs around the same time, the timetable may be updated to increase the number of services during that time.

Furthermore, the service plan formulating program 402 makes a change in such a way that this change will not affect the KPIs of other transportation modes in the nearby area. This can be done through well-known techniques such as AI (artificial intelligence), machine learning, and the like.

What can be changed may differ depending on the transportation mode and depending on the policy of each transportation operator. Thus, the system may be configured such that the operator can select, on the spot or in advance, what can be changed, the priority thereof, and the like in the service plan. Typically, making a change to the route might be difficult in rail transport. Considering this, the system may be configured such that a certain rule is established where a change should be made to the vehicle to be used, the timetable, the starting point and end point, and the route in this order in rail transport, and a change should be made only to the route and the vehicle to be used in the on-demand bus, and the like, for example, and the service plan formulating program 402 formulates a service plan based on this rule.

Whether it is possible to change an item of the service plan may depend on the time constraint (such as the duration until the time by which the KPI needs to be improved). If the KPI needs to be improved within a couple of days in a service plan of rail transport, for example, it is possible to make a change to the vehicle to be used or where to stop as well as increasing the number of services, but it is likely to be impossible to add a new train station or a new route. However, if the KPI needs to be improved within a couple of years, adding a new train station or a new route might be feasible. Thus, the service arbitration system 102 may hold the information regarding the items that can be changed and the priority thereof corresponding to not only to the transportation mode, but also to the time constraint, and the service plan formulating program 402 may formulate and revise a service plan based on such information.

The service plan formulating program 402 issues a simulation request to the simulation system 103 (step 804). At this time, the service plan formulating program 402 also issues the conditions acquired in step 802 and the service plan formulated in step 803 to the simulation system 103. The simulation system 103 operates the aforementioned simulation program 501 on the basis of the issued service plan and the issued simulation request, and the number of users and the delay time are simulated for a case in which the service plan is implemented.

The aforementioned current state program 401 calculates the KPI values once again on the basis of the simulation results in step 804, and evaluates the service state (step 805).

The service plan formulating program 402 determines whether the KPIs for each transportation operator and each transportation mode are satisfied or not (step 806). In this process, the service plan formulating program 402 determines not only whether the KPIs for the transportation operator and the transportation mode to be improved are satisfied, but also whether the KPIs for all of the relevant transportation operators and transportation modes are satisfied. If the service plan formulating program 402 determines that the KPIs are satisfied, the service plan formulating program 402 sends the service plan formulating results to the agreement forming system 204 or the transportation operator service planning system 203, and then ends the process.

On the other hand, if it is determined that there is a transportation operator or transportation mode with an unsatisfied KPI as a result of step 806, the service planning formulating program 402 determines whether there are any other proposed plans (step 807). For example, if another plan can be acquired from step 803, that plan may be used for the proposed plan, or the process of step 803 may be performed once again to select a different plan from the previous plan.

In determining whether there are other plans or not in step 807, a prescribed number of proposed plans may be used for the target of the determination. Alternatively, when it takes longer than a prescribed duration (30 minutes, for example) to repeat the process from step 803 to step 807, it can be determined that there are no other plans. Alternatively, a system may be configured such that the number of plans or the duration, which is used as the target value, can be designated by each transportation operator or transportation mode.

In particular, in rail transport, bus, and the like, for example, it is desirable to obtain a better plan even if the process requires a longer time. Thus, it is effective to configure the system such that the number of plans or the duration, which is used for the target, can be set to a higher number in advance, or such that a transportation operator or an operating company of a transportation mode can designate the number of plans or the duration. On the other hand, on-demand bus, taxi, and the like, for example, are not on a fixed schedule, and therefore, the real-time planning is likely to be needed. Thus, it is preferable to set the number of plans or duration to a lower number in advance, or it is preferable that the transportation operator or an operating company of the transportation mode be able to designate the number of plans or duration.

The service plan formulating program 402 repeats the process from step 804 to step 807 described above until it is determined that the KPIs of the respective transportation operators and transportation modes are satisfied in step 806, or until there is no more proposed plans in step 807. In repeating this process, the simulation in step 804 and the calculation/evaluation on the KPI values in step 805 are performed using a new plan.

When the service plan formulating program 402 determines that there are no more proposed plans in step 807, or in other words, the calculation/evaluation of the KPI values have been performed on all of the proposed plans, the service plan formulating program 402 sends the service plan deemed to best satisfy the KPIs in step 806, the simulation results, and conditions including the transportation operators, transportation modes, services, sections and the like with unsatisfied KPIs, and issues a recommendation request to the travel recommendation system 101 (recommendation planning program 301) (step 808).

Here, the recommendation planning program 301 in the travel recommendation system 101 formulates a recommendation plan as described above (see FIG. 7). At this time, by specifying the conditions including the transportation operator, transportation mode, service, section, and the like to be improved, which were acquired in step 802, or specifying the area, the number of users, and the like as the recommendation target, it is possible to identify the recommendation target area and the recommendation target users in a recommendation plan as described above.

The service plan formulating program 402 determines whether the recommendation plan has been updated or not (step 809), and if the recommendation plan has been updated, the service plan formulating program 402 repeats the process from step 804 to step 808 until the KPIs are satisfied, or the recommendation plan can no longer be updated. In this case, if a prescribed number of recommendation plans have already been updated, it can be determined that there are no more recommendation results to be updated. In repeating the process, it is also possible to formulate a new service plan before performing the simulation in step 804. However, in order to minimize the repetition of the plan formulation and the recommendation results, it is preferable to make a change to a vehicle (capacity) and the like, instead of modifying the timetable and the route.

If it is determined that the KPIs of the respective transportation operators and transportation modes are satisfied in step 806, or if the recommendation results do not have to be updated anymore in step 810, the service plan formulating program 402 sends the service plan that was deemed to best satisfy the KPIs in step 806 as the service plan formulation result to the agreement forming system 204 or the transportation operator service planning system 203 (step 810), and then ends the process.

In the example described above, the KPI values were evaluated for the possible service revision plans, and then a recommendation plan was formulated. However, the step of formulating a recommendation plan and the step of changing a service plan of this embodiment does not have to take place in this order. For example, the service arbitration system 102 may revise a service plan after a recommendation plan is formulated by the travel recommendation system 101. Alternatively, one service plan and one recommendation plan may form a set of plans where after the service arbitration system 102 changes one service plan, the travel recommendation system 101 formulates one recommendation plan in response to the change. On the other hand, one recommendation plan and one service plan may form a set of plans, where after the travel recommendation system 101 formulates one recommendation plan, the service arbitration system 101 formulate one service plan in response to the formulation of the recommendation plan. There is no special limitation on the sequence and the number of proposed plans to be combined.

<Structure of Transportation Data>

FIG. 9 is a diagram for explaining an example of a data structure of the transportation data 411 stored in the service arbitration system 102 according to an embodiment of the present invention.

The transportation data 411 includes service plans, actual performance data, and usage performance data of a plurality of transportation operators and transportation modes.

Specifically, the transportation data 411 of FIG. 9 includes a country 901, a region 902, a starting point 903, an end point 904, a link 905, a road type 906, an operator 907, a transportation mode 908, a vehicle type 909, the number of crew 910, a capacity 910, an individual identifier 912, a date 913, a day 914, a scheduled time 915, an actual time 916, a delay time 917, boarding passengers 918, alighting passengers 919, transported passengers 920, occupancy 921, total revenue 922, and the like.

The county 901 indicates a county in which a section from a starting point and an end point of a transportation mode is located, which is to be described later. For example, the country 901 may has a value or a text sting that can uniquely identify each country such as a county code or country name.

The region 902 indicates a region in which a section from a starting point and an end point of a transportation mode is located, which is to be described later. For example, the region 902 may have a value or a text string that can uniquely identify each region together with the aforementioned country name such as a region code or region name.

The starting point 903 and the end point 904 respectively indicate a starting point and an end point of a shortest section of a transportation mode of an operator, which is to be described later. For example, the starting point 903 and the end point 904 may be a text string or a numerical value such as a region name, an address, a bus stop name, a station name, a bus stop code, a station name, or the latitude/longitude. The starting point and the end point may be two adjacent bus stops or train stations, for example, and the end point may be a train station or a bus stop that comes after the starting point.

The link 905 is a set of the starting point and the end point, and indicates a section. For example, the link 905 may be a text constituted of a starting point and an end point connected by a hyphen or the like.

The road type 906 indicates a road type of the link. Examples of the road type 906 include a railway, a highway, a city highway, and a local road. The road type 906 may include a national road, a prefectural road, and a municipal road as the local road, and the Tokyo-Nagoya expressway as the highway, and may be represented by a numeral value or a text string that can identify each road type.

The operator 907 indicates a transportation operator that operates a transportation mode and the aforementioned link, which is to be described later. For example, the operator 907 may be a numerical value or a text string that uniquely identify each operator such as an operator code or an operator name.

The transportation mode 908 may indicate a vehicle such as railroad, scheduled bus, on-demand bus, taxi, and the like, and may be a text string or a numerical value that uniquely identifies each mode of transportation.

The vehicle type 909 is a type of vehicle to be used, and may be a text string or a numerical value representing the size of the vehicle (such as extra-large, large, medium, regular, compact), for example. This may also be a combination of the number of cars used.

The number of crew 910 may have the number of crew operating the transportation mode in the link.

The capacity 911 is the capacity of a vehicle to be used, which is specified in the vehicle type, and may be a numerical value that indicates the ride capacity.

The individual identifier 912 is an identifier for the vehicle to be used, which is indicated in the vehicle type, and may be anything that can uniquely identify each vehicle. For example, the individual identifier 912 may be a numerical value such as a vehicle registration number or an ID of an on-board device, or a text string such as a series number or a combination of a series code and a service number.

The date 913 indicates the date of service. The date 913 may be in any formats that can indicate the year, the month, and the day on which the service is operated such as a text string of YYYY/MM/DD (Y is for the year, M is for the month, and D is for the day), or a combination of YYYYMMDD and a numeral value of a fixed digit number, for example.

The day 914 indicates a day of the week when the vehicle indicated with the date above is in service. For example, the day 914 may be a text string indicating a day of the week, or may be a numerical value corresponding to a day, such as Monday being 1, and Tuesday being 2.

The scheduled time 915 is a schedule time of departure from the aforementioned starting point, and is a scheduled departure time from a station or a bus stop shown in a timetable or the like, for example. This may be in any formats that can indicate the scheduled departure time from the corresponding starting point such as a text string in which hours and minutes are separated by ":", or a numerical value with a fixed digit number such as HHMM (H is hours and M is minutes). If the schedule time has not yet been determined, a text string such as NA or a special numerical value such as 0 may be entered in the scheduled time 915.

The actual time 916 is the actual time of departure from the aforementioned starting point, and may have the same format as the aforementioned scheduled time 915.

The delay time 917 is a difference between the aforementioned scheduled time and the aforementioned actual time. This indicates how late the actual departure time was from the scheduled departure time, and may be a numerical value such as minutes or seconds indicating the delay time. If the delay time cannot be defined because the schedule time has yet to be determined or for other reasons, a text string such as NA or a special numerical value such as 0 may be entered.

The boarding passengers 918 is the number of people who got on the vehicle having the aforementioned individual identifier at the aforementioned starting point, and may be a numerical value representing the number of boarding passengers.

The alighting passengers 919 is the number of people who got off the vehicle having the aforementioned individual identifier at the aforementioned starting point, and may be a numerical value representing the number of alighting passengers.

The transported passengers 920 is the number of people transported from the aforementioned starting point to the aforementioned end point by the vehicle having the aforementioned individual identifier, and may be a numerical value representing the number of passengers transported.

The occupancy 921 is the occupancy of the vehicle having the aforementioned individual identifier from the aforementioned starting point to the aforementioned end point, and is the space occupancy of the vehicle, for example. This may be a numerical value obtained by dividing the number of passengers transported by the aforementioned capacity, or a text string representing the numerical value.

The total revenue 922 is a revenue of the vehicle having the aforementioned individual identifier. For example, the total revenue 922 may be the total amount of fare paid by the passengers who used the vehicle, or the total amount of the revenue of all of the sections where the vehicle is in operation.

The transportation data 411 described above can indicate the service plans, the service performance, and the usage performance of a plurality of transportation operators and the transportation modes that serve a certain area.

<Service Plan Data Structure>

The data structure of the service plan data (such as the service plan 319, the service plan 412, the service plan 511) formulated by the service arbitration system 102 may be constituted of the country 901, the region 902, the starting point 903, the end point 904, the link 905, the road type 906, the operator 907, the transportation mode 908, the vehicle type 909, the number of crew 910, the capacity 911, the individual identifier 912, the date 913, the day 914, and the scheduled time 915.

This way, it is possible to represent the service plans of a plurality of transportation operators and transportation modes that serve a certain area.

<Simulation Result Data Structure>

The data structure of the simulation results of the simulation system (such as the simulation results 320 and the simulation results 413) may be the same as that of the aforementioned transportation data 411.

However, certain types of data such as the actual time 916, the delay time 917, the boarding passengers 918, the alighting passengers 919, the transported passengers 920, the occupancy 921, and the total revenue 922 may be a numerical value or a text string attained from the simulation results, instead of the actual data shown in the transportation data 411.

That is, the simulation system 103 receives the aforementioned service plan data, performs a simulation to calculate the actual time 916, the delay time 917, the boarding passengers 918, the alighting passengers 919, the transported passengers 920, the occupancy 921, the total revenue 922, and the like, and stores the results in the simulation results 413 and the like.

<Recommendation Plan Data Structure>

FIG. 10 is a diagram for explaining an example of a data structure of the recommendation data 512 generated by the travel recommendation system 101 according to an embodiment of the present invention.

As illustrated in FIG. 5, the recommendation plan 512 held by the simulation system 103 was formulated by the recommendation planning program 301 of the travel recommendation system 101. Thus, in actuality, a recommendation plan is formulated by the recommendation planning program 301 of the travel recommendation system 101, stored in the storage unit 310 (step 612 of FIG. 6), sent to the simulation system 103 via the service arbitration system 102 (step 613, 614), and stored in the storage unit 510 of the simulation system 103 as the recommendation plan 512.

The data structure of the recommendation plan 512 includes certain types of data for a plurality of users such as the departure point, the destination, the route, and the departure time, which are generated by the travel recommendation system 101.

Data of the recommendation plan 512 includes a user ID 1001, a plan ID 1002, a departure point 1003, a destination 1004, a section starting point 1005, a section end point 1006, a transportation mode 1007, a link 1008, a road type 1009, an operator 1010, a vehicle type 1011, a capacity 1012, an individual identifier 1013, a departure date 1014, a departure day 1015, a departure time 1016, a route characteristic 1017, selection prediction 1018, and the like.

The user ID 1001 is an ID of each user to whom the recommendation is given, and may be a text string or a numerical value that serves as a unique identifier of each user. If a route constituted of a plurality of links is recommended to the same user, there may be a plurality of pieces of data having the same user ID for that one user.

The plan ID 1002 is an ID for identifying each plan formulated by the travel recommendation system 101, and may be a text string or a numerical value that serves as a unique identifier for each plan. If a route constituted of a plurality of links is recommended to the same user, there may be a plurality of pieces of data with the same plan ID corresponding to the respective links as data regarding that one plan.

The departure point 1003 is a departure point recommended by the travel recommendation system 101 to the user indicated by the user ID. This may be a text string or a numerical value that uniquely identifies each departure point or each departure area. For example, the departure point 1003 may be a bus stop name or a station name from where the user departs, or a code thereof, or a numerical value or a text string that represents a place name or an address.

The destination 1004 is a destination recommended by the travel recommendation system 101 to the user indicated by the user ID (that is, the recommended place determined by the travel recommendation system 101). This may be a text string or a numerical value that uniquely identifies each destination or each destination area. For example, the destination 1004 may be a bus stop name, a station name, or a code thereof, which the user is headed for, or a numerical value or a text string that represents a place name or an address.

The section starting point 1005 is a starting point of each section on the route from the aforementioned departure point to the aforementioned destination, and may be a starting point of a section that the user can travel with one transportation mode without transfers, for example. This may be a text string or a numerical value that uniquely identifies each starting point or each starting area of the section. For example, the section starting point 1005 may be a bus stop name, a station name or a code thereof, or a numerical value or a text string that represents a place name or an address.

The section end point 1006 is an end point corresponding to the starting point in each section on the route from the aforementioned departure point to the aforementioned destination (or in other words, the recommended route determined by the travel recommendation system 101), and may be an end point corresponding to the starting point of a section that the user can travel with one transportation mode without transfers, for example. The section end point 1006 may also be a station or bus stop next to the section starting point. The section end point 1006 may be a text string or a numerical value that uniquely identifies each end point or each end area of the section. For example, the section end point 1006 may be a bus stop name, a station name, or a code thereof, which the user is headed for, or a numerical value or a text string that represents a place name or an address.

The transportation mode 1007 is a transportation mode used by the user from the aforementioned starting point to the aforementioned end point, and indicates a transportation means such as rail transport, scheduled bus, on-demand bus, or taxi. The transportation mode 1007 may be a text string or a numerical value that uniquely identifies each transportation mode, and needs to correspond to the transportation mode 908 of the transportation data 411.

The link 1008 is a set of the section starting point and the section end point, and indicates one section. For example, the link 1008 may be a text string constituted of a section starting point and a section end point connected by a hyphen or the like.

The road type 1009 indicates a road type of the link. Examples of the road type 1009 include a railway, a highway, a city highway, and a local road. The road type 1009 may include a national road, a prefectural road, and a municipal road as the local road, and the Tokyo-Nagoya expressway as the highway. The road type 1009 may be a numerical value or a text string that can identifies each of the aforementioned types, but needs to correspond to the road type 906 of the transportation data 411.

The operator 1010 indicates a transportation operator that operates the aforementioned transportation mode in the aforementioned link, and in particular, a transportation operator of the transportation mode used by the user in the link. This may be a numerical value or a text string that uniquely identifies each operator such as an operator code or an operator name, but needs to correspond to the operator 907 in the transportation data 411.

The vehicle type 1011 is a type of vehicle in the aforementioned transportation mode used by the user, and may be a text string or a numerical value representing the size of the vehicle (such as extra-large, large, medium, regular, compact), for example. This may also be a combination of the number of cars used. This data needs to correspond to the vehicle type 909 of the transportation data 411.

The capacity 1012 is the capacity of a vehicle to be used, which is specified in the aforementioned vehicle type, and may be a numerical value that indicates the ride capacity. This data needs to correspond to the capacity 911 of the transportation data 411.

The individual identifier 1013 is an identifier for the vehicle to be used, which is indicated in the aforementioned vehicle type, and may be anything that can uniquely identify each vehicle. For example, the individual identifier 1013 may be a numerical value such as a vehicle registration number or an ID of an on-board device, or a text string such as a series number or a combination of a series code and a service number. The individual identifier 1013 needs to correspond to the individual identifier 912 of the transportation data 411.

The departure date 1014 is a date on which the user departs from the aforementioned departure point to the aforementioned destination. For example, the departure date 1014 may be in any formats that can indicate the year, month, and day of the service such as a text string of YYYY/MM/DD (Y is for the year, M is for the month, and D is for the day), or a combination of YYYYMMDD and a numerical value of a fixed digit number, for example. The departure data 1014 preferably have the same format as that of the date 913 in the aforementioned transportation data 411.

The departure day 1015 indicates a day of the week corresponding to the departure date described above. For example, the departure day 1015 may be a text string that represents a day of the week or a numerical value corresponding to a day such as 1 being Monday, and 2 being Tuesday. The departure day 1015 needs to correspond to the day 914 in the transportation data 411 described above.

The departure time 1016 is a scheduled time of departure at which the user having the aforementioned user ID departs from the aforementioned departure point or the starting point, and more specifically, is the aforementioned departure timing calculated by the travel recommendation system 101. This may be in any formats that can indicate the scheduled departure time from the corresponding starting point such as a text string in which hours and minutes are separated by ":", or a numerical value with a fixed digit number such as HHMM (H is for hours and M is for minutes), but it is preferable to use the same format at the time in the transportation data 411.

The route characteristic 1017 is a characteristic of the travel from the aforementioned section starting point to the aforementioned section end point with the aforementioned transportation mode, and the characteristic of a route determined by the travel recommendation system 101. This is, for example, a characteristic selected by the travel recommendation system 101 for a route that is likely to be selected by the target user among a less-crowded route, a less expensive route, a faster route, an easier route with fewer transfers, and the like, and may be a numerical value or a text string that can uniquely identify each characteristic.

The selection prediction 1018 is the probability of the recommendation target user selecting this destination or route, which was predicted in the selection prediction (step 710) by the travel recommendation system 101.

The recommendation plan revision/execution results generated by the travel recommendation system 101 may have the same data structure as illustrated in FIG. 10.

In the example of FIG. 10, the section starting point 1005, the section end point 1006, the transportation mode 1007, the link 1008, the road type 1009, the operator 1010, the vehicle type 1011, the capacity 1012, the individual identifier 1013, the departure date 1014, and the departure day 1015 were stored separately from the respective corresponding items in the service plan, but it is also possible to replace each piece of data with an index or ID of the corresponding row in the service plan as a reference to the corresponding data in the service plan.

With the recommendation plan data described above, the service arbitration system 102 can formulate a service plan, and the simulation system 103 can perform a simulation. Additionally, the simulation system 103 can perform a simulation reflecting the recommendation plan, and the service arbitration system 102 can formulate a service plan reflecting the recommendation plan taking into consideration the simulation results. Conversely, the travel recommendation system 101 can formulate a recommendation plan on the basis of the simulation and the service plan.

<Transportation User Terminal Display Screen>

Figure 11:
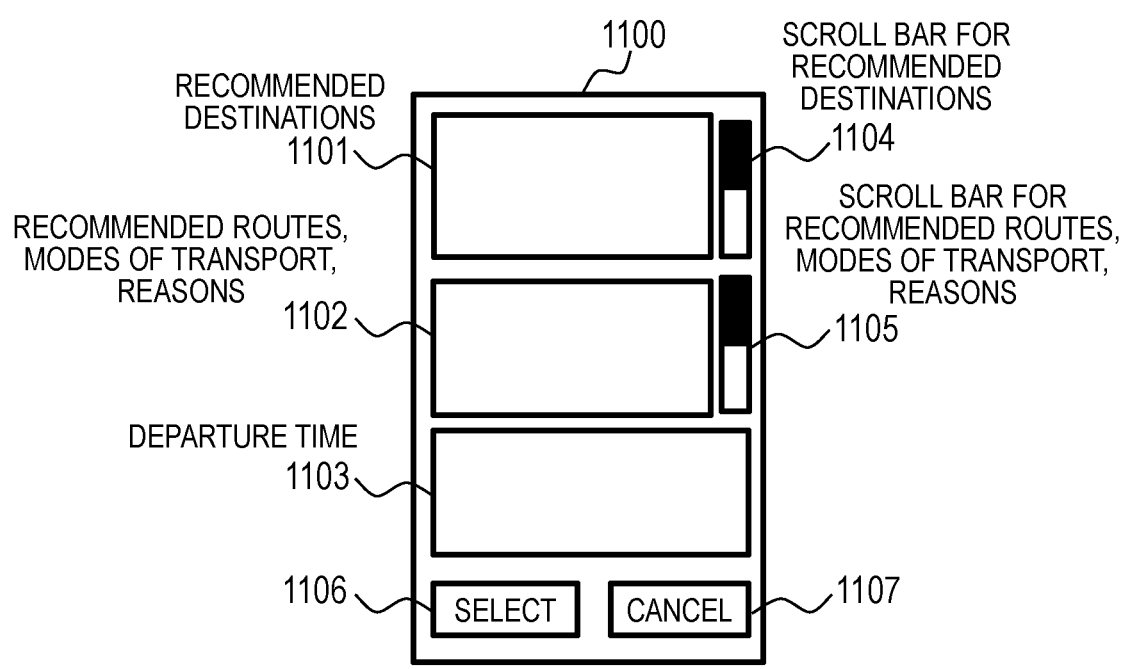
FIG. 11 is a diagram for explaining an example of a display screen of a transportation user terminal according to an embodiment of the present invention.

FIG. 11 is a diagram for explaining an example of a display screen of the transportation user terminal 202 according to an embodiment of the present invention.

A display screen 1100 of the transportation user terminal 202 displays a recommended destination 1101, recommended route/transportation means and reason for the recommendation (will be simply referred to as the recommended route/transportation means and the reason thereof below) 1102, a departure timing 110, a scroll bar for the recommended destination 1104, a scroll bar for the recommended route/transportation means and the reason thereof, a select button 1106, and a cancel button 1107.

In the display area of the recommended destination 1101, the recommended places attained from the recommendation plan revision/execution results of the travel recommendation system 101 are displayed. This may be displayed in such a manner that the user can easily understand, such as a list that includes place names or images of the destination 1004 in the recommendation plan data.

The recommendation plan data described above (see FIG. 10) does not include the reason for recommendation, but the data structure of the recommendation plan data may be extended to include this information so that the reason for recommendation will also be displayed. For example, with the well-known cooperative filter method, a reason such as "people who visited xx also visited this place" can be generated. Alternatively, with the well-known content-based recommendation, a reason such as "this is recommended for those who like xx." This makes it possible to display messages such as "Supermarket A: xx is on sale now," "B Park: people who visited xx also visit here," and the like.

Also, for each of the recommended destinations, the travel recommendation system 101 may make a prediction, and display the selection prediction result (that is, the selection prediction 1018) stored in the recommendation plan data, or the travel recommendation system 101 may display the recommended destinations in a descending order from the recommended destination with the highest selection probability (the recommended destination that is most likely to be selected).

The scroll bar for the recommended destination 1104 is displayed when there are a plurality of recommended destinations that cannot be displayed at once in the display area. By the user moving the scroll bar 1104, all of the recommended destinations will be displayed. If the user can scroll down or up by swiping the screen with their finger as in a smartphone, the scroll bar 1104 can be omitted.

In the display area of the recommended route/transportation means and the reason thereof 1102, the recommended routes to reach the destinations attained from the recommendation plan revision/execution results of the travel recommendation system 101 are displayed. This may be displayed in such a manner that the user can easily understand, such as a list of text strings or images of a set of the section starting point 1005 and the section end point 1006, or the link 1008, the transportation mode 1007, and the operator 1010 for each plan ID 1002 corresponding to the destination 1004 in the recommendation plan data.

Here, the route characteristic 1017 stored in the recommendation plan data described above may be displayed as the reason for recommendation. This way, a reason such as "less crowded," "less expensive," "faster," "fewer transfers" can be displayed, for example. Also, for each of the recommended routes, the travel recommendation system 101 may make a prediction, and display the selection prediction result (that is, the selection prediction 1018) stored in the recommendation plan data, or the travel recommendation system 101 may display the recommended routes in a descending order from the recommended route with the highest selection probability (the recommended route that is most likely to be selected). The recommendation plan data described above (see FIG. 10) does not include the reason for recommendation, but the data structure of the recommendation plan data may be extended to include this information so that the reason for recommendation will also be displayed. Furthermore, it is also possible to indicate that there is congestion on the route, and display a prediction result as to when the congestion will be cleared.

The scroll bar for the recommended route/transportation means and the reason thereof 1105 is displayed when there are a plurality of recommended routes and stopping points that cannot be displayed in the display area at once. By the user moving the scroll bar, all of the recommended routes and stopping points will be displayed. If the user can scroll down or up by swiping the screen with their finger as in a smartphone, the scroll bar 1105 can be omitted.

In the display area of the departure time 1103, the calculated departure timings attained from the recommendation plan revision/execution results of the travel recommendation system 101 are displayed. This may be achieved by displaying the departure time 1016 and the route characteristic 1017 of the recommendation plan data, and the time when the route becomes less crowded in such a manner that the user can easily understand. Examples of the display include "the route will be less busy if departing at HH:MM" and "You will likely to find an open seat if you leave now" by comparing the current time with the departure time.

The select button 1106 is a button used by the user to select and approve of the recommended destination and route. This way, the user can book their travel itinerary, and create a plan based on the itinerary. The system may also be configured such that a necessary payment can be processed through a publicly known method. The system may also be configured such that the user can close the display screen illustrated in FIG. 11 by operating the select button 1106.

The cancel button 1107 is a button to delete the recommended destination and route, and close the display screen.

With this screen configuration, the recommendation plan revision/execution results by the travel recommendation system 101 can be presented to the user, and the user can select a destination, a route, and the like. The selected destination, route, and the like may also be used as the selection results of the recommendations for the recommendation selection prediction described above.

<Transportation Operator Service Planning System Display Screen>

Figure 12:
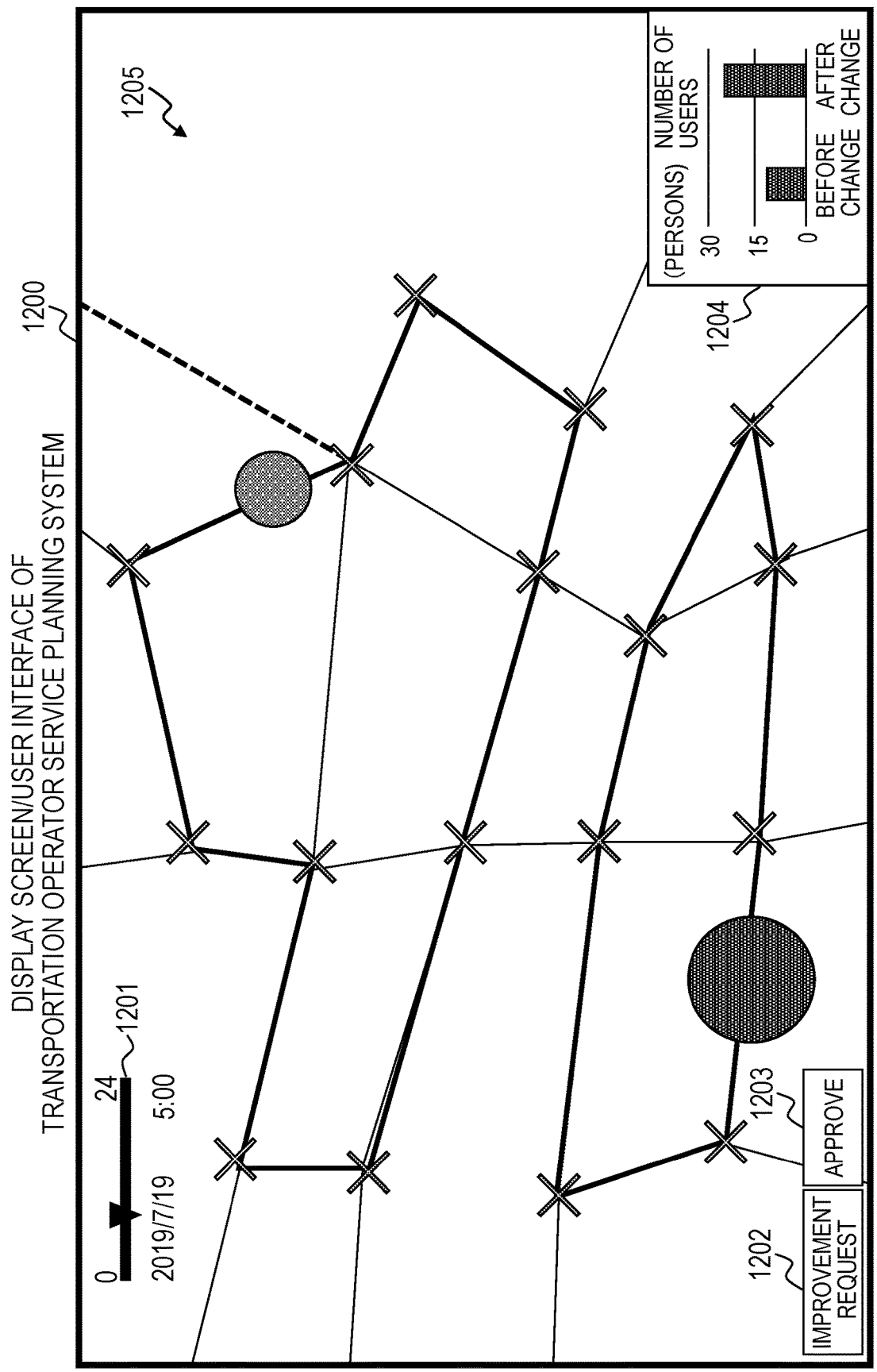
FIG. 12 is a diagram for explaining an example of a display screen of a transportation operator service planning system of a transportation operator according to an embodiment of the present invention.

FIG. 12 is a diagram for explaining an example of a display screen of the transportation operator service planning system 203 of a transportation operator according to an embodiment of the present invention.

A display screen 1200 of the transportation operator service plan system 203 includes a time bar 1201, an improvement request button, an approve button 1203, and a KPI display area 1204, in addition to the route and service status of the transportation mode operated by the transportation operator displayed on a map 1205.

The time bar 1201 displays the date and time of the service, and is used to specify a point in time for which the service status is displayed by moving a slider, for example. It is also possible to specify a date, for example.

The improvement request button 1202 is a button to issue a service improvement request to the service arbitration system 102. For example, when the user (in FIG. 12, the transportation operator or the like that uses the transportation operator service planning system 203) operates the improvement request button 1202 without specifying anything, the transportation operator service planning system 203 issues an improvement request to the service arbitration system 102, targeting all of the transportation modes, the routes, the service, and the sections of the transportation operator that is being displayed (or in other words, using those items as the conditions).

"X" in the figure indicates a starting point or an end point of a service section of the transportation mode, or in other words, a bus stop or a station, for example, and the bold lines are the service routes of the transportation mode.

"•" in the figure indicates the position of the driving vehicle of the transportation mode at the time indicated by the time bar 1201, and the size of the circle indicates the number of passengers or the occupancy at that point, for example. This may be realized by specifying the size of the circle at a prescribed ratio, on the basis of the number of transported passengers or the occupancy in the transportation data or the data of the simulation results. The color of the circle indicates the delay time from the scheduled time, for example, and the color may be changed depending on the degree of delay, for example. The color may be changed on the basis of the delay time attained from the transportation data or the simulation result data.

The aforementioned relationships between the color and shape of the symbols (such as "•") and the information represented by them (the number of passengers, delay time, and the like) are examples, and various different relationships other than this are possible. For example, the size of the circle may represent the delay time, and the color of the circle may represent the number of passengers. Alternatively, a numeral indicating the delay time or the number of passengers may be displayed in the circle, or a symbol other than a circle may be used to represent a certain type of information.

In the KPI display area 1204, the KPIs designated by the transportation operator and the values thereof are displayed as a graph, or the like, for example. Examples of the KPIs include the number of users and the delay time as described above, and the KPIs may vary depending on the transportation operator. FIG. 12 illustrates an example where the number of users was used for the KPI. What is used for the KPI may be designated through a configuration file by each operator in advance, or may be designated using the display screen. A plurality of KPIs may be used, and each KPI may be given a priority level.

In the KPI display area 1204, if nothing is specified, the results of calculating the KPIs based on all of the transportation modes, the routes, the services, and the sections of the transportation operator that is being displayed (or in other words, using those items as the conditions) are displayed in a graph or the like.

The display screen 1200 may be configured such that the user can designate the display duration of the KPIs and KPI values, the transportation mode, the route, the service, the section, and the like, or such that the user can select a KPI to be improved if there are a plurality of KPIs, For example, the display screen 1200 may be configured such that when the user designates the service by tapping "•", the section by tapping a line between X, or the route and transportation mode by encircling the entire line on the map 1205, the KPI and the KPI value corresponding to the designated conditions will be displayed.

Additionally, the display screen 1200 may be configured such that a KPI to be improved can be designated by tapping that KPI on the display.

The broken line in the figure indicates a change point. The example of FIG. 12 illustrates a case in which a new shuttle route is to be added to the section indicated by the broken line. Such a change may be realized by changing an existing route, for example, and the display screen 1200 may be configured such that this type of change can be designated by the user.

In this case, as illustrated in FIG. 12, the display screen 1200 may be configured such that both the current (pre-change) and post-change KPIs and KPI values are displayed. Alternatively, the display screen 1200 may be configured such that a service change point made by the service arbitration system is indicated by a broken line or the like, and both the current (pre-change) and post-change KPIs and KPI values are displayed.

The approve button 1203 is a button to approve of the change in service plan, and by operating this button, the user (operator) can issue an approval notification to the service arbitration system 102 regarding the service plan displayed on the current screen (that is, the new plan after the service plan is changed as described above).

With the display screen 1200 illustrated in FIG. 12, it is possible to confirm the KPIs and the KPI values for each transportation operator, each transportation mode, each route, each service, and each section, designate an improvement target, and issue an improvement request to the service arbitration system. It is also possible to confirm the KPIs and the KPI values after the service plan is changed, and make a decision on the service plan.

<Transportation Operator Service Planning System Display Screen (Example of Another Operator)>

Figure 13:
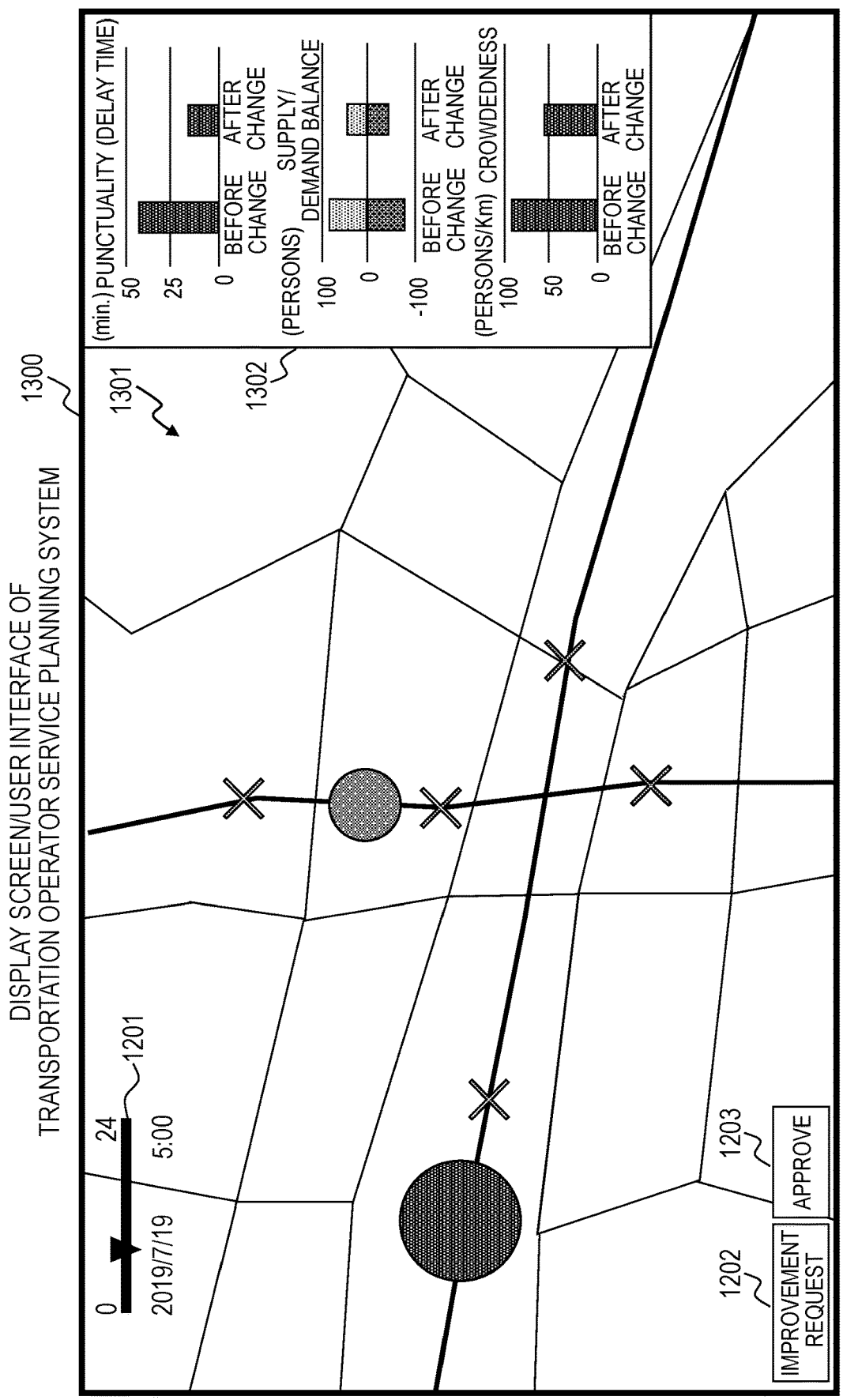
FIG. 13 is a diagram for explaining an example of a display screen of the transportation operator service planning system of another transportation operator according to an embodiment of the present invention.

FIG. 13 is a diagram for explaining an example of a display screen of the transportation operator service planning system 203 of another transportation operator according to an embodiment of the present invention.

FIG. 13 illustrates an example of a display screen 1300 of the transportation operator service planning system 203 managed by a transportation operator differing from that of FIG. 12. This example indicates that there are two transportation modes that run from North to South and from East to West, respectively, as illustrated by a map 1301.

As illustrated in the KPI display area 1302, in this example, the punctuality (such as a delay time), the supply/ demand balance (which is 0 when the number of passengers is equal to the capacity, and if the capacity is exceeded, a positive value is added, and if the capacity is not reached, a negative value is added), and the crowdedness (such as the number of passengers per traveled distance) are displayed as the KPIs.

Other basic display contents and operation methods are the same as those of FIG. 12.

The example of FIG. 13 illustrates in particular a case where the display content is limited to the transportation mode operated by a specific transportation operator.

<Agreement Forming System Display Screen>

Figure 14:
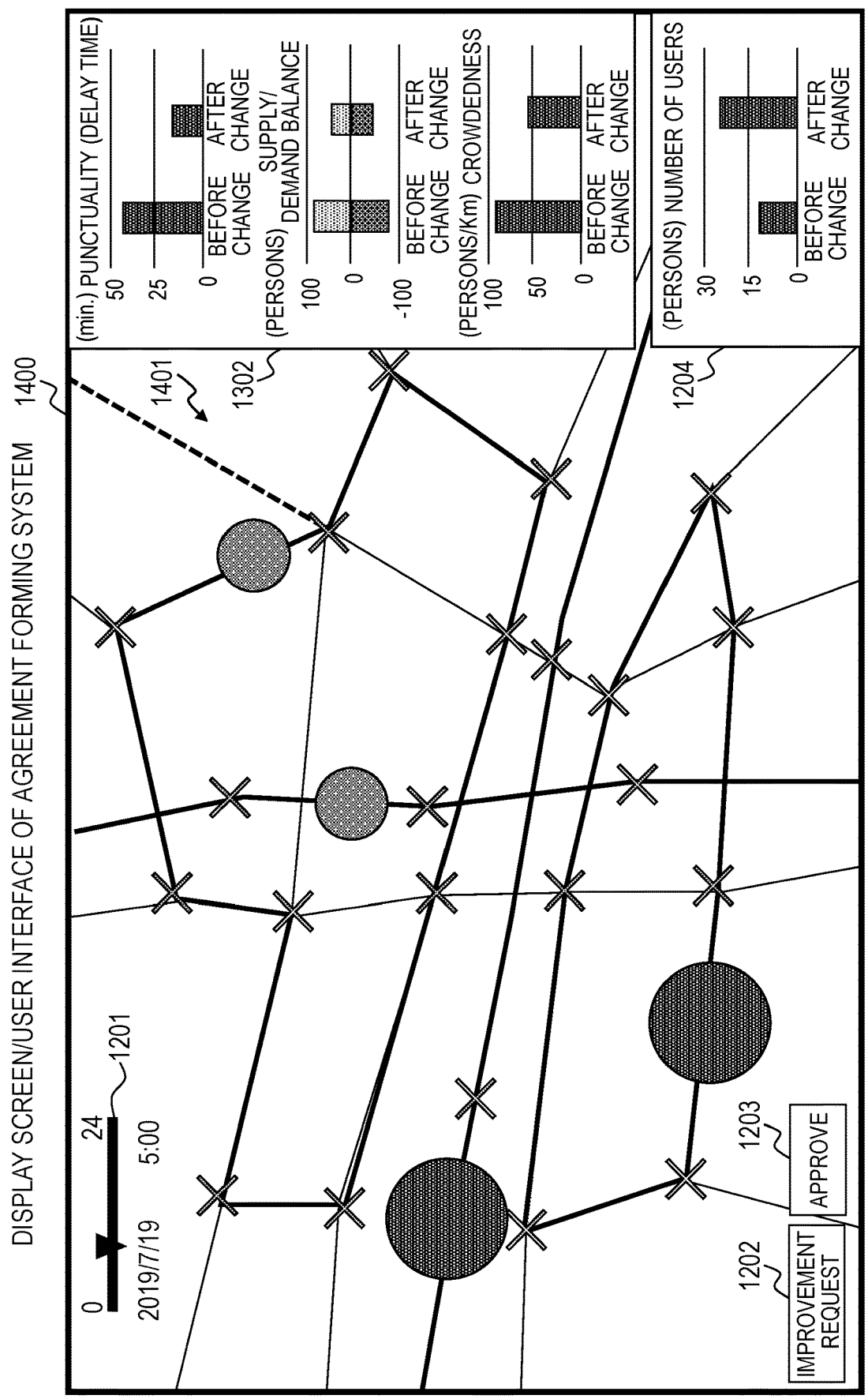
FIG. 14 is a diagram for explaining an example of a display screen of an agreement forming system according to an embodiment of the present invention.

FIG. 14 is a diagram for explaining an example of a display screen of the agreement forming system 204 according to an embodiment of the present invention.

In the agreement forming system 204, a plurality of transportation modes that are in operation in the target area are collectively displayed.

FIG. 14 illustrates an example in which the display content is for the transportation mode of the transportation operator of FIG. 12 and for the transportation mode of the transportation operator of FIG. 13, in particular.

As illustrated in FIG. 14, in a display screen 1400 of the agreement forming system 204, the respective displays of the transportation operator service planning system 203 for the respective transportation modes that are in operation in this area are merged. In the example of FIG. 14, the display on the map 1205 illustrated in FIG. 12 and the display on the map 1301 illustrated in FIG. 13 are merged and displayed on a map 1401.

Other basic display contents and operation methods are the same as those of FIGS. 12 and 13.

With this agreement forming system 204, it is possible to formulate a service plan for the services of a plurality of transportation modes in one area such that each KPI satisfies a designated value, and the services of the plurality of transportation modes can be arbitrated.

That is, according to the embodiment described above, it is possible to realize "ALL WIN" service in which the KPIs of all transportation modes do not decrease for a plurality of existing transportation modes, or even if a new transportation mode were added to the existing transportation modes, for example. For the transportation user, in particular, this provides benefits such as the convenience of less crowded or smoother travel, and the improved QoL as promotion of travel improves health. For the transportation operators, it is possible to form an agreement for the multi-mode transportation in MaaS, and achieve a sustainable operation. For local communities and businesses, economic benefits are attained from promotion of tourism and shopping.

A system of an embodiment of the present invention may be configured as described below.

(1) A transportation service planning system, including: an operation unit (at least one of the operation units 300, 400, and 500, for example); and a storage unit (at least one of the storage units 310, 410, and 510), wherein the storage unit stores therein: an evaluation index (KPI in step 601 and 801, for example) designated for each of a plurality of transportation systems; a creation condition of a service plan for each of the plurality of transportation systems (the condition in steps 601, 702, and 802, for example); and a service simulation condition for each of the plurality of transportation systems (at least one data from the event/advertisement information 513 to the travel information 517, or information extracted from those types of information, for example), wherein the operation unit is configured to: create a service plan for each of the plurality of transportation systems on the basis of the creation condition of the service plan; simulate a service of each of the plurality of transportation systems on the basis of the service plan and the simulation condition; calculate the evaluation index of each of the plurality of transportation systems on the basis of the simulation results; output the service plan if all of the evaluation indices satisfy a prescribed standard; and revise the service plan if at least one of the evaluation indices does not satisfy the prescribed standard.

With this configuration, it is possible to realize a service in which the KPIs of all transportation modes do not decrease for a plurality of existing transportation modes, or even if a new transportation mode were added to the existing transportation modes, for example. Additionally, it is possible to form an agreement for the multi-mode transportation in MaaS, and achieve a sustainable operation.

(2) In the configuration of (1), the operation unit is configured to create a recommendation plan (the recommendation plan, for example) that encourages a transportation user to travel on the basis of the service plan (step 806: NO, step 808, for example), and simulate a service of each of the plurality of transportation systems for a case in which travel by the transportation user following the recommendation plan is added to the simulation condition (steps 615 and 804, for example).

With this configuration, transportation users receive several benefits such as the convenience of less crowded or smoother travel, and the improved QoL as promotion of travel improves health. For local communities and businesses, economic benefits can be attained from promotion of tourism and shopping.

(3) In the configuration of (2) described above, the operation unit is configured to revise the service plan on the basis of the recommendation plan (step 607, for example), and simulate a service of each of the plurality of transportation systems on the basis of the revised service plan (step 615, for example), or simulate a service of each of the plurality of transportation systems and revise the service plan on the basis of the recommendation plan.

With this configuration, it is possible to predict the effect on the improvement of KPIs of the recommendation plan.

(4) In the configuration of (3) described above, the operation unit is configured to revise the recommendation plan on the basis of the revised service plan (step 621, for example); and output the revised service plan (steps 622 and 711, for example).

With this configuration, even when the service plan is changed, an appropriate travel recommendation reflecting this change can be made.

(5) In the configuration of (2) described above, the recommendation plan includes a travel destination of the transportation user, a route to the destination, a stopping point, and a departure time (steps 707 to 709, for example).

With this configuration, it is possible to improve the convenience factor for the transportation users.

(6) In the configuration of (2) described above, the operation unit creates the recommendation plan on the basis of an attribute and a past behavior record of the transportation user (steps 612, 707 to 709, for example).

With this configuration, a recommendation that is more likely to be selected by the transportation user can be made, leading to improved KPIs and QoL.

(7) In the configuration of (2) described above, the storage unit stores a probability of the transportation user following the recommendation plan (selection prediction 1018, for example), and the operation unit simulates a service of each of the plurality of transportation systems for a case in which travel by the transportation user following the recommendation plan occurs as indicated by the probability.

With this configuration, it is possible to appropriately predict the effect on the improvement of KPIs of the recommendation.

(8) In the configuration of (7) described above, the probability of the transportation user traveling in accordance with the recommendation plan is calculated on the basis of past data on whether or not the transportation user has followed the recommendation plan in the past, or past data indicating that the transportation user has selected the proposed recommendation plan in the past.

With this configuration, it is possible to appropriately predict the effect on the improvement of KPIs of the recommendation.

(9) In the configuration of (1) described above, the storage unit stores information indicating a priority level of each item of the service plan to be revised for each of the plurality of transportation systems, and the service plan is revised by making a change to the items in accordance with the priority level, starting from an item with the highest priority.

With this configuration, it is possible to propose a feasible and appropriate change to the service plan.

(10) In the configuration of (9), the priority level is determined on the basis of a transportation mode of each transportation system. The priority level may be designated for each transportation mode of each transportation system.

With this configuration, it is possible to propose a feasible and appropriate change to the service plan in accordance with the characteristics of the transportation mode.

(11) In the configuration of (10), the priority level can be designated for each transportation mode of a transportation system.

With this configuration, it is possible to propose a feasible and appropriate change to the service plan in accordance with the characteristics of the transportation mode.

(12) In the configuration of (9), the priority level is determined on the basis of a length of time until when the evaluation index needs to be improved by.

With this configuration, it is possible to propose a feasible and appropriate change to the service plan in accordance with the characteristics of the transportation mode and the time constraint.

(13) In the configuration (1) described above, the operation unit terminates the revision of a service plan at a timing corresponding to a characteristic of a transportation mode for each of the plurality of transportation systems. Also, it is possible to specify this termination timing.

With this configuration, it is possible to formulate a service plan within a prescribed duration for a transportation mode in which a service plan needs to be formulated in real-time.

The present invention is not limited to the embodiment described above, and may include various modification examples. For example, the embodiment described above was explained in detail to support a better understanding of the present invention, and the present invention does not necessarily have to have all of the configurations explained above. It is possible to replace a configuration of an embodiment with a configuration of another embodiment, and it is possible to add a configuration from one embodiment to a configuration of another embodiment. A configuration of each embodiment may include another configuration, or may be deleted or replaced with another configuration.

Part or all of the aforementioned configurations, functions, processing units, processing means, and the like may be realized as hardware by designing an integrated circuit that has those configurations, for example. The aforementioned configurations, functions, and the like may be realized by software where a processor interprets and executes a program that realizes each function. The information for realizing the respective functions such as programs, tables, and files may be stored in a storage device such as a non-volatile semiconductor memory, a hard disk drive, or an SSD (solid state drive), or a non-transitory computer readable data storage medium such as an IC card, an SD card, and a DVD.

The control lines and information lines illustrated in the figures are the lines considered necessary for explaining the invention, and not all of the control lines and information lines of the product are necessarily included. In actuality, almost all of the configurations can be regarded as being connected to each other.

What is claimed is:

1. A transportation service planning system, comprising:
   an operation unit; and
   a storage unit,
   wherein the storage unit stores therein:
   an evaluation index designated for each of a plurality of transportation systems;
   a creation condition of a service plan for each of the plurality of transportation systems; and
   a service simulation condition for each of the plurality of transportation systems,
   wherein the operation unit is configured to:
   create a service plan for each of the plurality of transportation systems on the basis of the creation condition of the service plan;
   simulate a service of each of the plurality of transportation systems on the basis of the service plan and the simulation condition;
   calculate the evaluation index designated for each of the plurality of transportation systems on the basis of the simulation results;
   output the service plan if all of the evaluation indices satisfy a prescribed standard; and
   revise the service plan if at least one of the evaluation indices does not satisfy the prescribed standard,
   wherein the operation unit is configured to:
   create a recommendation plan that encourages a transportation user to travel on the basis of the service plan; and
   simulate a service of each of the plurality of transportation systems for a case in which travel by the transportation user following the recommendation plan is added to the simulation condition,
   wherein the operation unit creates the recommendation plan on the basis of an attribute and a past behavior record of the transportation user, and
   wherein the evaluation index designated for each of the plurality of transportation systems comprises a difference between capacity and occupancy, and the number of users per traveled distance.

2. The transportation service planning system according to claim 1,
   wherein the operation unit is configured to:
   revise the service plan on the basis of the recommendation plan; and
   simulate a service of each of the plurality of transportation systems on the basis of the revised service plan, or simulate a service of each of the plurality of transportation systems and revise the service plan on the basis of the recommendation plan.

3. The transportation service planning system according to claim 2,
wherein the operation unit is configured to:
revise the recommendation plan on the basis of the revised service plan; and
output the revised service plan.

4. The transportation service planning system according to claim 1,
wherein the recommendation plan includes a travel destination of the transportation user, a route to the destination, a stopping point, and a departure time.

5. The transportation service planning system according to claim 1,
wherein the storage unit stores a probability of the transportation user following the recommendation plan, and
wherein the operation unit simulates a service of each of the plurality of transportation systems for a case in which travel by the transportation user following the recommendation plan occurs as indicated by the probability.

6. The transportation service planning system according to claim 5,
wherein the probability of the transportation user traveling in accordance with the recommendation plan is calculated on the basis of past data on whether or not the transportation user has followed the recommendation plan in the past, or past data indicating that the transportation user has selected the proposed recommendation plan in the past.

7. The transportation service planning system according to claim 1,
wherein the storage unit stores information indicating a priority level of each item of the service plan to be revised for each of the plurality of transportation systems, and
wherein the service plan is revised by making a change to the items in accordance with the priority level, starting from an item with the highest priority.

8. The transportation service planning system according to claim 7,
wherein the priority level is determined on the basis of a transportation mode of each of the plurality of transportation systems.

9. The transportation service planning system according to claim 8,
wherein the priority level can be designated for a transportation mode of each of the transportation systems.

10. The transportation service planning system according to claim 7,
wherein the priority level is determined on the basis of a length of time until when the evaluation index needs to be improved by.

11. The transportation service planning system according to claim 1,
wherein the operation unit terminates the revision of a service plan at a timing corresponding to a characteristic of a transportation mode for each of the transportation systems.

12. The transportation service planning system according to claim 11,
wherein it is possible to specify when the revision of a service plan is to be terminated in accordance with a characteristic of the transportation mode.

13. A transportation service planning method conducted by a computer system that has an operation unit and a storage unit,
wherein the storage unit stores therein:
an evaluation index designated for each of a plurality of transportation systems;
a creation condition of a service plan for each of the plurality of transportation systems; and
a service simulation condition for the plurality of transportation systems, and
wherein the transportation service planning method comprises:
a step in which the operation unit creates a service plan for each of the plurality of transportation systems on the basis of the creation condition of a service plan;
a step in which the operation unit simulates a service of each of the plurality of transportation systems on the basis of the service plan and the simulation condition;
a step in which the operation unit calculates the evaluation index designated for each of the plurality of transportation systems on the basis of the simulation results;
a step in which the operation unit outputs the service plan if all of the evaluation indices satisfy a prescribed standard; and
a step in which the operation unit revises the service plan if at least one of the evaluation indices does not satisfy the prescribed standard,
wherein the operation unit is configured to:
create a recommendation plan that encourages a transportation user to travel on the basis of the service plan; and
simulate a service of each of the plurality of transportation systems for a case in which travel by the transportation user following the recommendation plan is added to the simulation condition,
wherein the operation unit creates the recommendation plan on the basis of an attribute and a past behavior record of the transportation user, and
wherein the evaluation index designated for each of the plurality of transportation systems comprises a difference between capacity and occupancy, and the number of users per traveled distance.

* * * * *